United States Patent
Tarama et al.

(10) Patent No.: US 8,414,393 B2
(45) Date of Patent: Apr. 9, 2013

(54) GAME DEVICE, CONTROL METHOD FOR A GAME DEVICE, AND A NON-TRANSITORY INFORMATION STORAGE MEDIUM

(75) Inventors: Naoki Tarama, Kanagawa (JP); Naohiro Yamamoto, Tokyo (JP)

(73) Assignee: Konami Digital Entertainment Co., Ltd., Tokyo (JP)

(*) Notice: Subject to any disclaimer, the term of this patent is extended or adjusted under 35 U.S.C. 154(b) by 0 days.

(21) Appl. No.: 13/283,804

(22) Filed: Oct. 28, 2011

(65) Prior Publication Data

US 2012/0108334 A1  May 3, 2012

(30) Foreign Application Priority Data

Oct. 28, 2010 (JP) .................... 2010-242816

(51) Int. Cl.
- A63F 9/24 (2006.01)
- A63F 13/00 (2006.01)
- G06F 17/00 (2006.01)
- G06F 19/00 (2006.01)

(52) U.S. Cl.
USPC ............................... 463/36; 463/7

(58) Field of Classification Search ............ 463/7, 36
See application file for complete search history.

(56) References Cited

U.S. PATENT DOCUMENTS

| | | | |
|---|---|---|---|
| 2002/0142843 A1 | 10/2002 | Roelofs | |
| 2002/0160823 A1* | 10/2002 | Watabe et al. | 463/7 |
| 2006/0187196 A1 | 8/2006 | Underkoffler et al. | |

FOREIGN PATENT DOCUMENTS

| | | |
|---|---|---|
| EP | 0837418 A2 | 4/1998 |
| EP | 1772173 A1 | 4/2007 |
| EP | 2039402 A2 | 3/2009 |
| JP | 3866474 A | 1/2007 |
| WO | 99/35633 A2 | 7/1999 |
| WO | 2005/070012 A2 | 8/2005 |

OTHER PUBLICATIONS

Extended European Search Report issued Apr. 12, 2012 in corresponding EP Patent Application No. 11008606.3.

* cited by examiner

*Primary Examiner* — Michael Cuff
*Assistant Examiner* — Kevin Y Kim
(74) *Attorney, Agent, or Firm* — Sughrue Mion, PLLC

(57) ABSTRACT

Provided is a game device which executes a game configured such that a position of a body part of a player is detected, including: a first determination unit for determining whether or not a reference position and a player position information acquired at a first determination time point, which is earlier than a reference time point, satisfy a first criterion; a second determination unit for determining whether or not the reference position and the player position information acquired at a second determination time point, which is later than the first determination time point, satisfy a second criterion; a first processing execution unit for performing processing relating to effects on the game based on a determination result from the first determination unit; and a second processing execution unit for performing processing relating to evaluation of the player based on a determination result from the second determination unit.

6 Claims, 11 Drawing Sheets

FIG.5

| BODY PART | THREE-DIMENSIONAL COORDINATES |
|---|---|
| HEAD | P1(X$_{P1}$, Y$_{P1}$, Z$_{P1}$) |
| SHOULDER | P2(X$_{P2}$, Y$_{P2}$, Z$_{P2}$) |
| LEFT UPPER ARM | P3(X$_{P3}$, Y$_{P3}$, Z$_{P3}$) |
| RIGHT UPPER ARM | P4(X$_{P4}$, Y$_{P4}$, Z$_{P4}$) |
| LEFT LOWER ARM | P5(X$_{P5}$, Y$_{P5}$, Z$_{P5}$) |
| RIGHT LOWER ARM | P6(X$_{P6}$, Y$_{P6}$, Z$_{P6}$) |
| BACK | P7(X$_{P7}$, Y$_{P7}$, Z$_{P7}$) |
| LEFT THIGH | P8(X$_{P8}$, Y$_{P8}$, Z$_{P8}$) |
| RIGHT THIGH | P9(X$_{P9}$, Y$_{P9}$, Z$_{P9}$) |
| LEFT SHIN | P10(X$_{P10}$, Y$_{P10}$, Z$_{P10}$) |
| RIGHT SHIN | P11(X$_{P11}$, Y$_{P11}$, Z$_{P11}$) |
| ⋮ | ⋮ |

| VALUE OF REFERENCE DATA | DETERMINATION METHOD |
|---|---|
| 0 | — |
| 1 | Ripple |
| 2 | Step |
| 3 | Pose |
| 4 | Lock |
| 5 | Solid |
| 6 | Stream |
| 7 | Gesture |

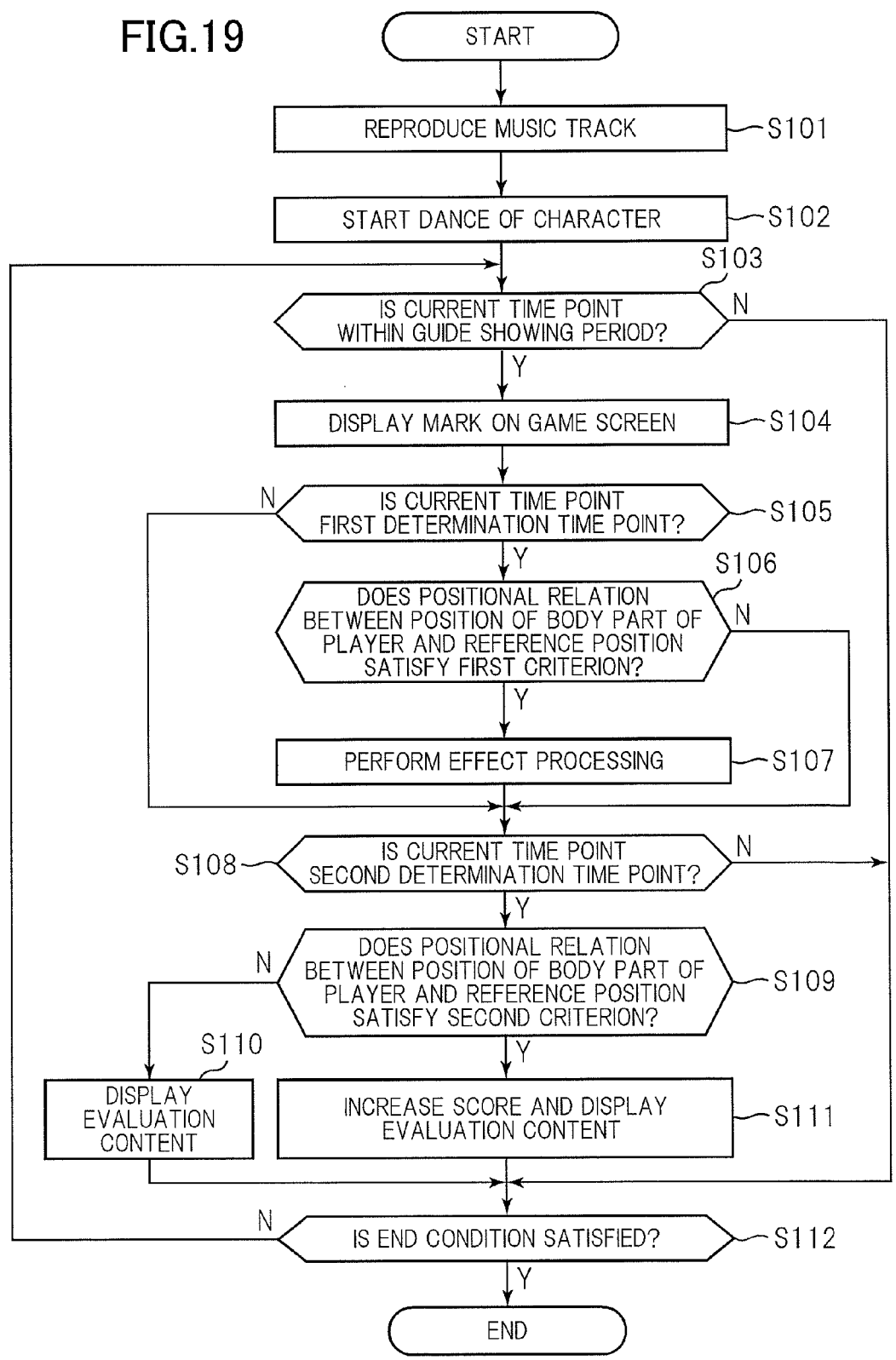

GAME DEVICE, CONTROL METHOD FOR A GAME DEVICE, AND A NON-TRANSITORY INFORMATION STORAGE MEDIUM

CROSS-REFERENCE TO RELATED APPLICATION

The present application claims priority from Japanese application JP 2010-242816 filed on Oct. 28, 2010, the content of which is hereby incorporated by reference into this application.

BACKGROUND OF THE INVENTION

1. Field of the Invention

The present invention relates to a game device, a control method for a game device, and a non-transitory information storage medium.

2. Description of the Related Art

There is known a game device for performing game processing by using an image (photographed image) of a player obtained by photographing the player with a camera. For example, JP 3866474 B2 (JP 2001-224730 A) discloses a game device that determines an operation performed by a player by analyzing the photographed image.

SUMMARY OF THE INVENTION

In a case where the operation performed by the player is determined based on the photographed image, processing for analyzing the image is performed, and hence it may require more time to determine the operation performed by the player than in a case where the operation performed by the player is determined based on an operation signal (for example, button depression signal) received from a general game controller. As a result, a time lag occurs between a time at which the player actually performs the operation and a time at which the game device determines that the player has performed the operation.

For example, as described in JP 3866474 B2, in the game configured such that the player moves their body in time to an action of a character displayed on a screen, a time lag occurs between a time at which the player dances in time to the action of the character and a time at which the game device determines that the player has danced, and hence there is a problem that the player feels stressed about an improper evaluation of the game in spite of dancing correctly.

The present invention has been made in view of the above-mentioned problem, and an object thereof is to provide a game device, a control method for a game device, and a non-transitory information storage medium therefor, which are capable of alleviating the stress placed on a player.

In order to solve the above-mentioned problem, according to the present invention, there is provided a game device which executes a game configured such that a position of a body part of a player at a given time point is determined, including: player position information acquiring means for acquiring player position information relating to the position of the body part of the player; reference data acquiring means for acquiring reference data from means for storing the reference data, the reference data being obtained by associating information relating to a reference time point with information relating to a reference position in which the body part is to be placed at the reference time point; guide showing means for showing the player the reference time point and the reference position based on the reference data; first determination means for determining whether or not the reference position and the position of the body part of the player indicated by the player position information acquired at a first determination time point, which is a time point set based on the reference time point and which is earlier than the reference time point, satisfy a first criterion relating to a positional displacement between the position of the body part and the reference position; second determination means for determining whether or not the reference position and the position of the body part of the player indicated by the player position information acquired at a second determination time point, which is a time point set based on the reference time point and which is later than the first determination time point, satisfy a second criterion which is a criterion relating to the positional displacement between the position of the body part and the reference position and which indicates a smaller positional displacement than the positional displacement indicated by the first criterion; first processing execution means for performing processing relating to effects on the game based on a determination result from the first determination means; and second processing execution means for performing processing relating to evaluation of the player based on a determination result from the second determination means.

Further, according to the present invention, there is provided a control method for a game device, which executes a game configured such that a position of a body part of a player at a given time point is determined, including: a player position information acquiring step of acquiring player position information relating to the position of the body part of the player; a reference data acquiring step of acquiring reference data from means for storing the reference data, the reference data being obtained by associating information relating to a reference time point with information relating to a reference position in which the body part is to be placed at the reference time point; a guide showing step of showing the player the reference time point and the reference position based on the reference data; a first determination step of determining whether or not the reference position and the position of the body part of the player indicated by the player position information acquired at a first determination time point, which is a time point set based on the reference time point and which is earlier than the reference time point, satisfy a first criterion relating to a positional displacement between the position of the body part and the reference position; a second determination step of determining whether or not the reference position and the position of the body part of the player indicated by the player position information acquired at a second determination time point, which is a time point set based on the reference time point and which is later than the first determination time point, satisfy a second criterion which is a criterion relating to the positional displacement between the position of the body part and the reference position and which indicates a smaller positional displacement than the positional displacement indicated by the first criterion; first processing execution step of performing processing relating to effects on the game based on a determination result obtained in the first determination step; and second processing execution step of performing processing relating to evaluation of the player based on a determination result obtained in the second determination step.

Further, according to the present invention, there is provided a program for causing a computer to function as a game device, which executes a game configured such that a position of a body part of a player at a given time point is determined, the game device including: player position information acquiring means for acquiring player position information relating to the position of the body part of the player; reference data acquiring means for acquiring reference data from means for storing the reference data, the reference data being obtained by associating information relating to a reference time point with information relating to a reference position in which the body part is to be placed at the reference time point; guide showing means for showing the player the reference time point and the reference position based on the reference data; first determination means for determining whether or not the reference position and the position of the body part of the player indicated by the player position information acquired at a first determination time point, which is a time point set based on the reference time point and which is earlier than the reference time point, satisfy a first criterion relating to a positional displacement between the position of the body part and the reference position; second determination means for determining whether or not the reference position and the position of the body part of the player indicated by the player position information acquired at a second determination time point, which is a time point set based on the reference time point and which is later than the first determination time point, satisfy a second criterion which is a criterion relating to the positional displacement between the position of the body part and the reference position and which indicates a smaller positional displacement than the positional displacement indicated by the first criterion; first processing execution means for performing processing relating to effects on the game based on a determination result from the first determination means; and second processing execution means for performing processing relating to evaluation of the player based on a determination result from the second determination means.

Further, the information storage medium according to the present invention is a non-transitory computer-readable information storage medium having the above-mentioned program recorded thereon.

According to the present invention, it is possible to alleviate the stress placed on the player.

Further, according to one aspect of the present invention, the first determination means determines whether or not the first criterion is satisfied by determining whether or not the position of the body part of the player indicated by the player position information acquired at the first determination time point is included in a first determination area set based on the reference position, and the second determination means determines whether or not the second criterion is satisfied by determining whether or not the position of the body part of the player indicated by the player position information acquired at the second determination time point is included in a second determination area which is an area set based on the reference position and which is covered by the first determination area.

Further, according to one aspect of the present invention, the game includes a game configured such that the player aims to perform the same action as a character displayed on display means, and the game device further includes means for acquiring information relating to a change direction of the body part of the character within a period set based on the reference time point, and means for changing the first determination area and the second determination area based on the acquired change direction.

Further, according to one aspect of the present invention, the first determination means determines whether or not the first criterion is satisfied based on whether or not a number of body parts, whose positional displacement amount between the position of the body part of the player indicated by the player position information acquired at the first determination time point and the reference position is within a reference range, is within a first reference range, and the second determination means determines whether or not the second criterion is satisfied based on whether or not a number of body parts, whose positional displacement amount between the position of the body part of the player indicated by the player position information acquired at the second determination time point and the reference position is within the reference range, is within a second reference range whose lower limit value is larger than a lower limit value of the first reference range.

BRIEF DESCRIPTION OF THE DRAWINGS

In the accompanying drawings:

FIG. 5 is a diagram illustrating an example of player position information generated by a position detecting device;

FIG. 19 is a flowchart illustrating an example of processing executed on the game device.

DETAILED DESCRIPTION OF THE INVENTION

[1. Embodiment]

Hereinafter, detailed description is given of an example of an embodiment of the present invention with reference to the drawings. A game device according to the embodiment of the present invention is implemented by, for example, a consumer game machine (stationary game machine), a portable game machine, a mobile phone, a personal digital assistant (PDA), or a personal computer. In this specification, description is given of a case where the game device according to the embodiment of the present invention is implemented by a consumer game machine.

Figure 1:
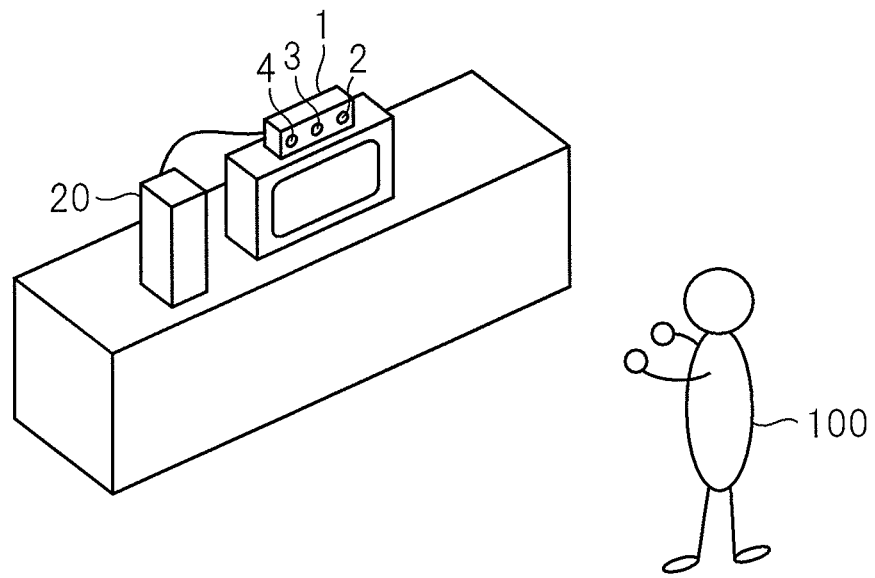
FIG. 1 is a diagram illustrating how a player plays a game.

FIG. 1 is a diagram illustrating how a player plays a game. As illustrated in FIG. 1, a player 100 is positioned, for example, in front of a position detecting device 1. The position detecting device 1 and a game device 20 are connected to each other so as to be able to communicate data therebetween.

[2. Operation of position detecting device]

First, the position detecting device 1 is described. The position detecting device 1 generates player position information relating to a position of the player in a three-dimensional space. In this embodiment, description is given of a case where position information on the player includes information relating to positions of a plurality of body parts of the player 100. The body parts of the player 100 include, for example, a head and both arms.

As illustrated in FIG. 1, the position detecting device 1 includes, for example, a CCD camera 2, an infrared sensor 3, and a microphone 4 including a plurality of microphones.

The CCD camera 2 is a known camera including a CCD image sensor. For example, the CCD camera 2 generates a photographed image (for example, RGB digital image) by photographing the player 100 at predetermined time intervals (for example, every 1/60th of a second).

Figure 2:
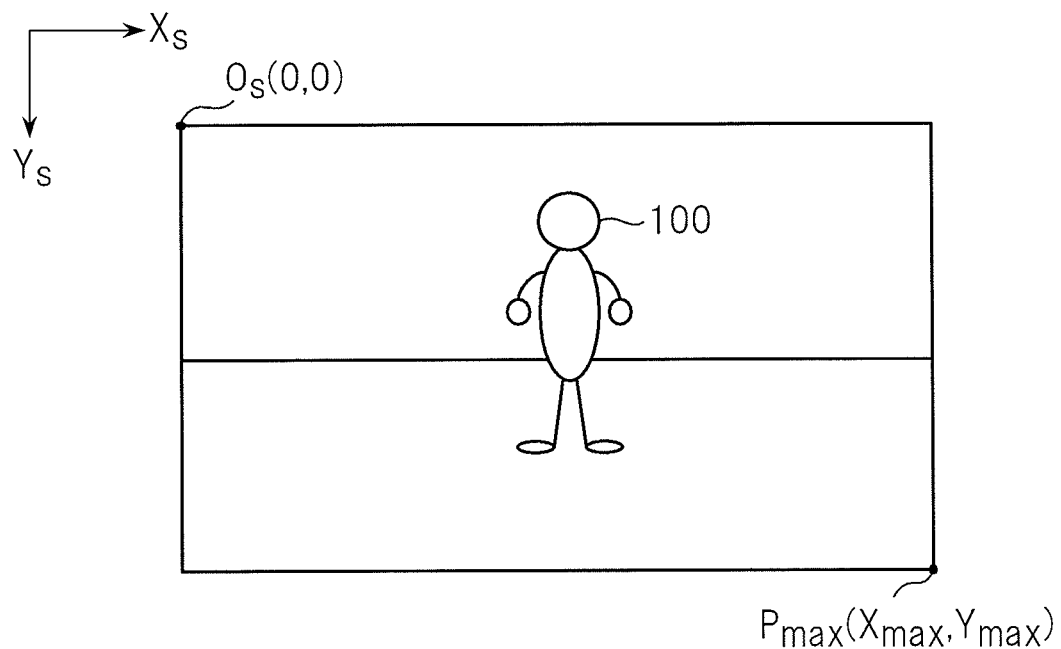
FIG. 2 is a diagram illustrating an example of a photographed image generated by a CCD camera.

FIG. 2 is a diagram illustrating an example of the photographed image generated by the CCD camera 2. As illustrated in FIG. 2, the photographed image includes, for example, the player 100. In the photographed image, there are set an Xs-axis and a Ys-axis, which are orthogonal to each other. For example, the upper left corner of the photographed image is set as an origin Os (0,0). Further, for example, the lower right corner of the photographed image is set as coordinates Pmax (Xmax, Ymax). The position of each pixel in the photographed image is identified by two-dimensional coordinates (Xs-Ys coordinates) that are assigned to each pixel.

The infrared sensor 3 is formed of, for example, an infrared emitting device and an infrared receiving device (for example, infrared diodes). The infrared sensor 3 detects reflected light obtained by emitting infrared light. The infrared sensor 3 measures the depth of a subject (for example, player 100) based on a detection result of the reflected light.

The depth of a subject is a distance between a measurement reference position and the position of the subject. The measurement reference position is a position that serves as a reference in measuring the depth (perspective) of the position of the player 100. The measurement reference position may be a predetermined position associated with the position of the position detecting device 1, such as the position of the infrared receiving device of the infrared sensor 3. The infrared sensor 3 measures the depth of the player 100 based, for example, on a time of flight (TOF), which is a time required for the infrared sensor 3 to receive reflected light after emitting infrared light.

Figure 3:
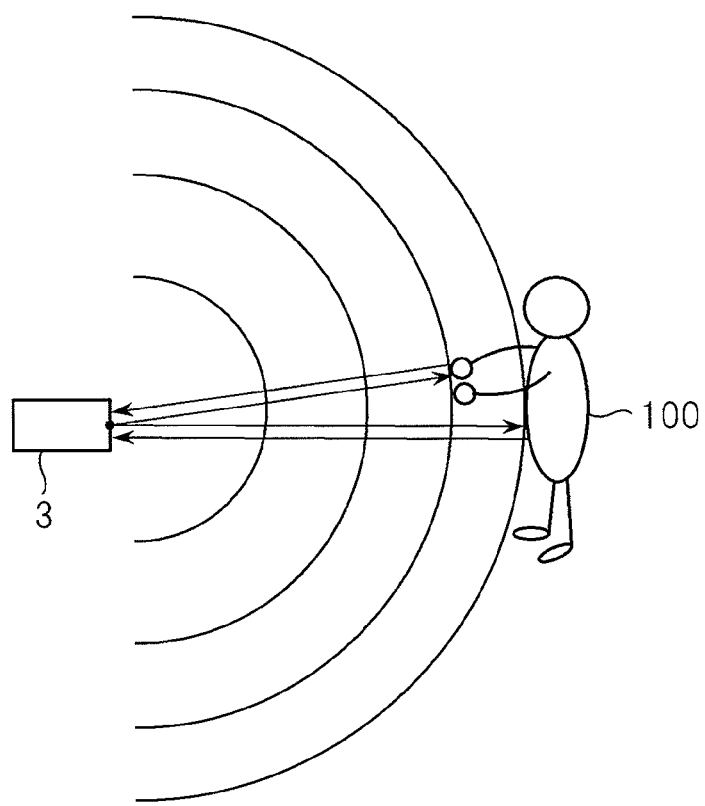
FIG. 3 is a diagram for describing a method of measuring a depth of the player, which is performed by an infrared sensor.

FIG. 3 is a diagram for describing a method of measuring the depth of the player 100, which is performed by the infrared sensor 3. As illustrated in FIG. 3, the infrared sensor 3 emits pulsed infrared light at predetermined intervals. The infrared light emitted from the infrared sensor 3 spreads spherically with an emission position of the infrared sensor 3 at the center.

The infrared light emitted from the infrared sensor 3 strikes, for example, surfaces of the body of the player 100. The infrared light that has struck those surfaces is reflected. The reflected infrared light is detected by the infrared receiving device of the infrared sensor 3. Specifically, the infrared sensor 3 detects reflected light having a phase shifted by 180° from that of the emitted infrared light.

For example, as illustrated in FIG. 3, in a case where the player 100 is holding out both hands, those held-out hands are closer to the infrared sensor 3 than the torso of the player 100. Specifically, the TOF of the infrared light reflected by both hands of the player 100 is shorter than the TOF of the infrared light reflected by the torso of the player 100.

The value determined as follows corresponds to the distance between the measurement reference position and the player 100 (that is, depth). Specifically, the value is determined by multiplying a time required for the infrared sensor 3 to detect the reflected light after emitting the infrared light (that is, TOF) by the speed of the infrared light, and then dividing the resultant value by two. In this manner, the infrared sensor 3 can measure the depth of the player 100.

Further, the infrared sensor 3 also detects an outline of a subject (player 100) by detecting depth differences acquired from the reflected infrared light. The fact that the infrared sensor 3 receives the reflected infrared light as described above means that an object is located at that place. Further, if there is no other object located behind the object in the vicinity, the depth difference between the object and the surroundings of the object is large. For example, the infrared sensor 3 detects the outline of the player 100 by joining portions having depth differences larger than a predetermined value.

Note that the method of detecting the outline of the player 100 is not limited to the above-mentioned example. Alternatively, for example, the outline may be detected based on the brightness of each pixel of the photographed image acquired by the CCD camera 2. In this case, it is equally possible to detect the outline of the player 100 by, for example, joining portions having large brightness differences among the pixels.

Information relating to the depth of the player 100 (depth information), which is detected as described above, is expressed as, for example, a depth image. In this embodiment, description is given by taking, as an example, a case where the depth information is expressed as a gray-scale depth image (for example, 256-bit gray-scale image data).

Figure 4:
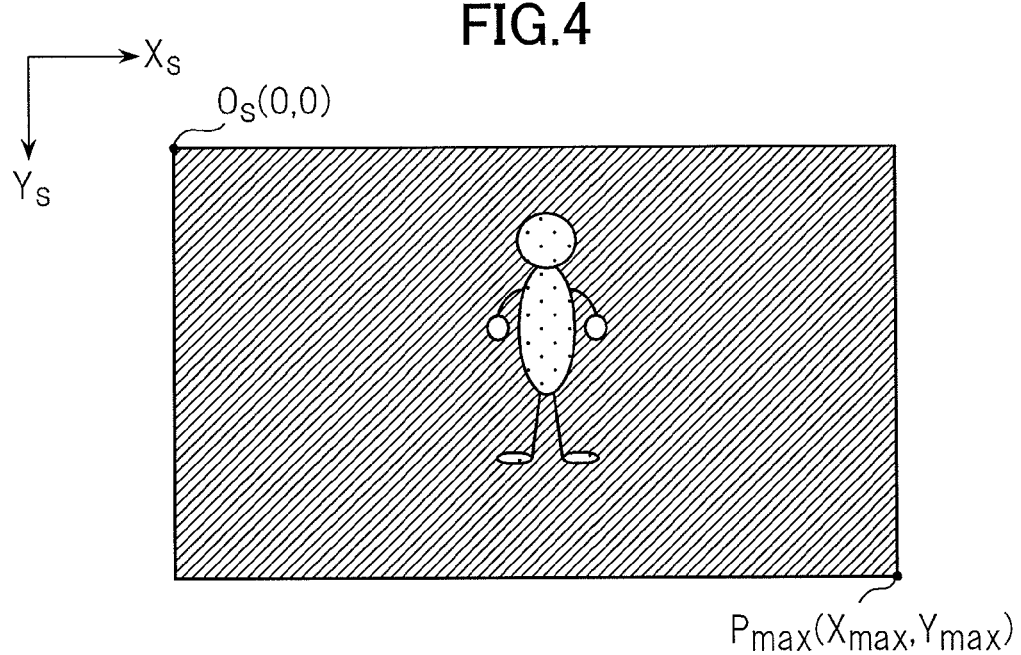
FIG. 4 is a diagram illustrating an example of a depth image acquired by the infrared sensor.

FIG. 4 is a diagram illustrating an example of the depth image acquired by the infrared sensor 3. As illustrated in FIG. 4, for example, an object located close to the infrared sensor 3 is expressed as bright (brightness is high), and an object located far from the infrared sensor 3 is expressed as dark (brightness is low). The depth of the player 100 corresponds to the brightness (pixel value) of the depth image.

For example, in a case where the depth image is expressed as the 256-bit gray-scale image data, for every 2-cm change in depth of the player 100, the depth image is changed in brightness by one bit. This case means that the infrared sensor 3 is capable of detecting the depth of the subject in units of 2 cm. In the case where the player 100 is holding out both hands forward (FIG. 3), as illustrated in FIG. 4, pixels corresponding to both hands of the player 100 are expressed as brighter (brightness is higher) than pixels corresponding to the torso.

In this embodiment, similarly to the CCD camera 2, the infrared sensor 3 generates the depth image at predetermined time intervals (for example, every 1/60th of a second). Based on the photographed image acquired by the CCD camera 2 and the depth image acquired by the infrared sensor 3, the player position information is generated relating to the positions of body parts of the player 100.

For example, there is generated a composite image (RGBD data) that is obtained by adding the depth information (D: depth) indicated by the depth image to the photographed image (RGB data) acquired by the CCD camera 2. In other words, the composite image contains, for each pixel, color information (lightness of each of R, G, and B) and the depth information.

When player position information is generated based on the composite image, first, based on the depth image, pixels corresponding to the outline of the player 100 are identified.

Next, in the composite image, the color information (lightness of R, G, and B) of pixels enclosed within the outline is referred to. Based on the color information of the composite image, pixels corresponding to each part of the body of the player 100 are identified. For this identification method, for example, a known method is applicable, such as a pattern matching method in which the object (that is, each part of the body of the player 100) is extracted from the image through a comparison with a comparison image (training image).

Based on the pixel values (RGBD values) of the pixels identified as described above, sets of the three-dimensional coordinates of the head, shoulders, etc. of the player 100 are calculated. For example, the three-dimensional coordinates are generated by carrying out predetermined matrix transformation processing on those pixel values. The matrix transformation processing is executed through, for example, a matrix operation similar to transformation processing performed in 3D graphics between two coordinate systems of a world coordinate system and a screen coordinate system. Specifically, the RGB value indicating the color information of the pixel and the D value indicating the perspective are substituted into a predetermined determinant, to thereby calculate the three-dimensional coordinate of the pixel.

Note that for the method of calculating the three-dimensional coordinate that corresponds to a pixel based on the pixel value (RGBD value), a known method may be applied, and the calculation method is not limited to the above-mentioned example. Alternatively, for example, the coordinate transformation may be performed using a lookup table.

FIG. 5 is a diagram illustrating an example of the player position information generated by the position detecting device 1. As illustrated in FIG. 5, the player position information includes a plurality of pieces of information relating to positions of a plurality of body parts of the player 100. As the player position information, for example, each part of the player 100 and the three-dimensional coordinates are stored in association with each other.

Figure 6:
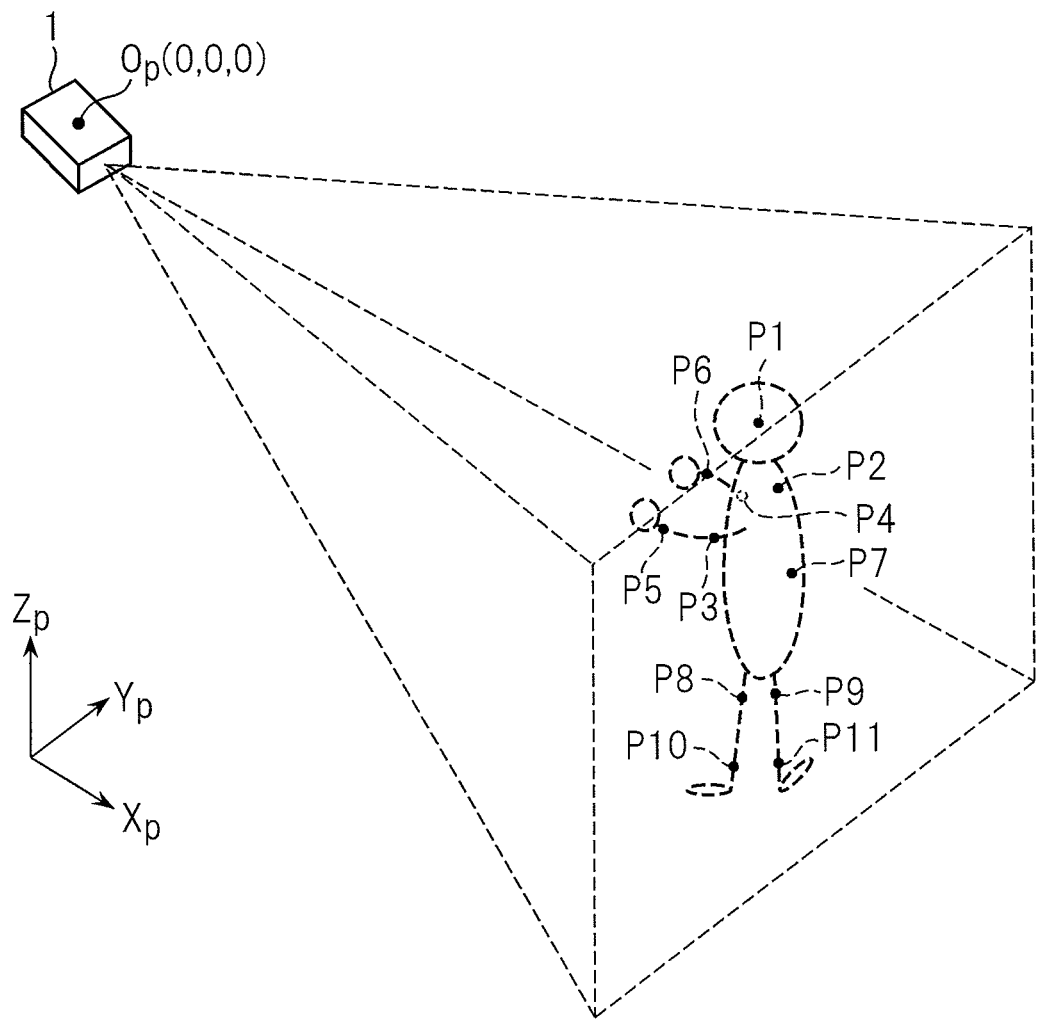
FIG. 6 is a diagram illustrating a position of the player, which is identified by the player position information.

FIG. 6 is a diagram illustrating the position of the player 100, which is identified by the player position information. In this embodiment, for example, a predetermined position corresponding to the position detecting device 1 (for example, the measurement reference position) is set as an origin Op. For example, the origin Op represents the three-dimensional coordinates corresponding to the measurement reference position of the infrared sensor 3. Note that the position of the origin Op may be set anywhere in the three-dimensional space in which the player 100 exists. For example, the three-dimensional coordinates corresponding to the origin Os of the photographed image may be set as the origin Op.

As illustrated in FIG. 6, in this embodiment, description is given of a case where the player position information includes body part information relating to the positions of, at least, the head and the waist from among the plurality of body parts of the player 100. For example, the player position information includes eleven sets of three-dimensional coordinates corresponding to the head P1, shoulders P2, left upper arm P3, right upper arm P4, left lower arm P5, right lower arm P6, back P7, left thigh P8, right thigh P9, left shin P10, and right shin P11 of the player 100.

Note that the part of the body of the player 100, which is indicated by the player position information, may be a part that is determined in advance from the player's body (skeletal frame). For example, any part of the body may be used as long as the part is identifiable by the above-mentioned pattern matching method.

For example, the player position information generated every predetermined time interval (for example, every 1/60th of a second) is transmitted from the position detecting device 1 to the game device 20. The game device 20 executes the game by receiving the player position information from the position detecting device 1 and grasping the movement of the body of the player (hereinafter, reference numeral "100" of the player is omitted).

[3. Game Executed on Game Device]

The game device 20 executes a game configured such that the position of a body part of the player at a given time point is determined. In this embodiment, for example, description is given of a case where the game device 20 executes a game configured such that the player dances in time to a dance performed by a character 32. For example, the player aims to perform the same action (dance) as a character displayed on a game screen.

Figure 7:
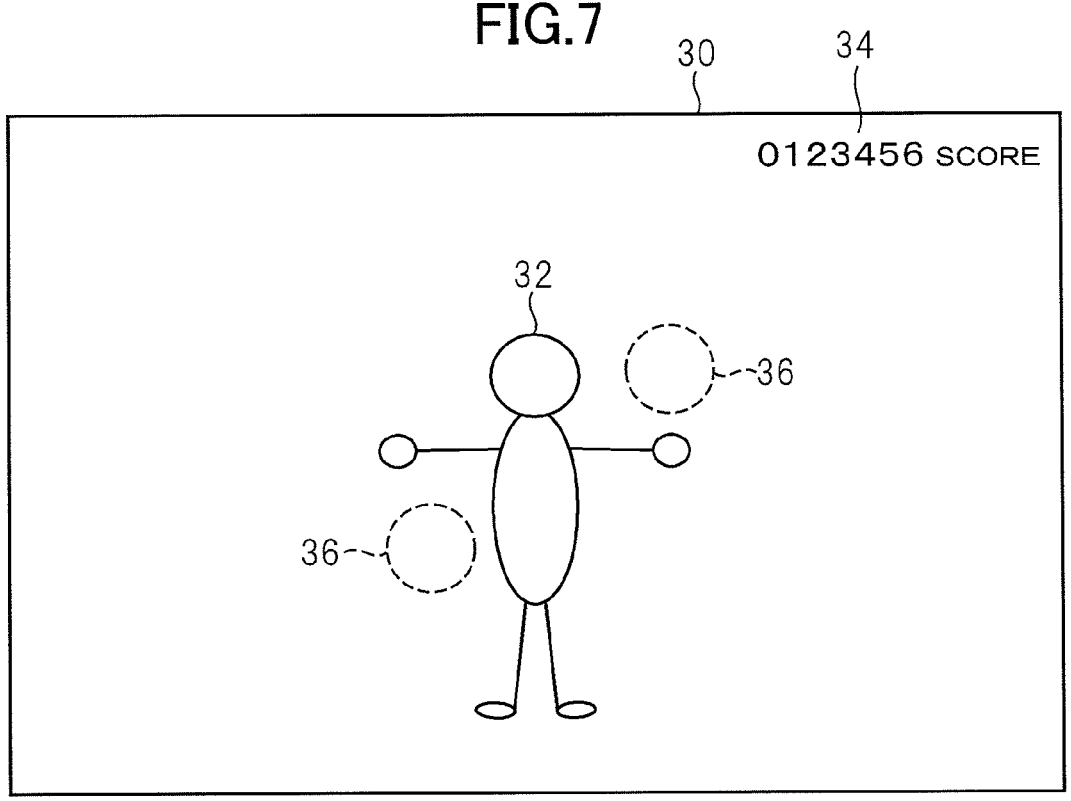
FIG. 7 is a diagram illustrating an example of a game screen.

FIG. 7 is a diagram illustrating an example of the game screen. As illustrated in FIG. 7, a game screen 30 includes the character 32 that dances in tune with a music track and a score 34 indicating a score of the player. The character 32 is displayed based on, for example, data created by performing motion capturing processing on a picture obtained by photographing a dance performed by a dancer.

In this embodiment, when a time at which the game device 20 determines the action of the player is approaching, a mark 36 designed after a bubble is displayed on the game screen 30. The player plays a game with the help of the mark 36. In other words, the mark 36 is an image for showing the player a position and a time at which the character 32 is to move its body. For example, in a case where the hand of the character 32 touches the center of the mark 36, if the player is performing the same action, the player can obtain an excellent evaluation.

Note that in this embodiment, the player plays the game while facing the character 32 displayed on the game screen 30, and hence the game screen 30 displays the character 32 so that the character 32 performs a dance that is left-right reversed to the dance supposed to be performed by the player. For example, when the character 32 raises its hand on the right side when viewed from the player (its hand on the left side when viewed from the character 32), if the player raises their right hand, the player can obtain an excellent evaluation.

Figure 8:
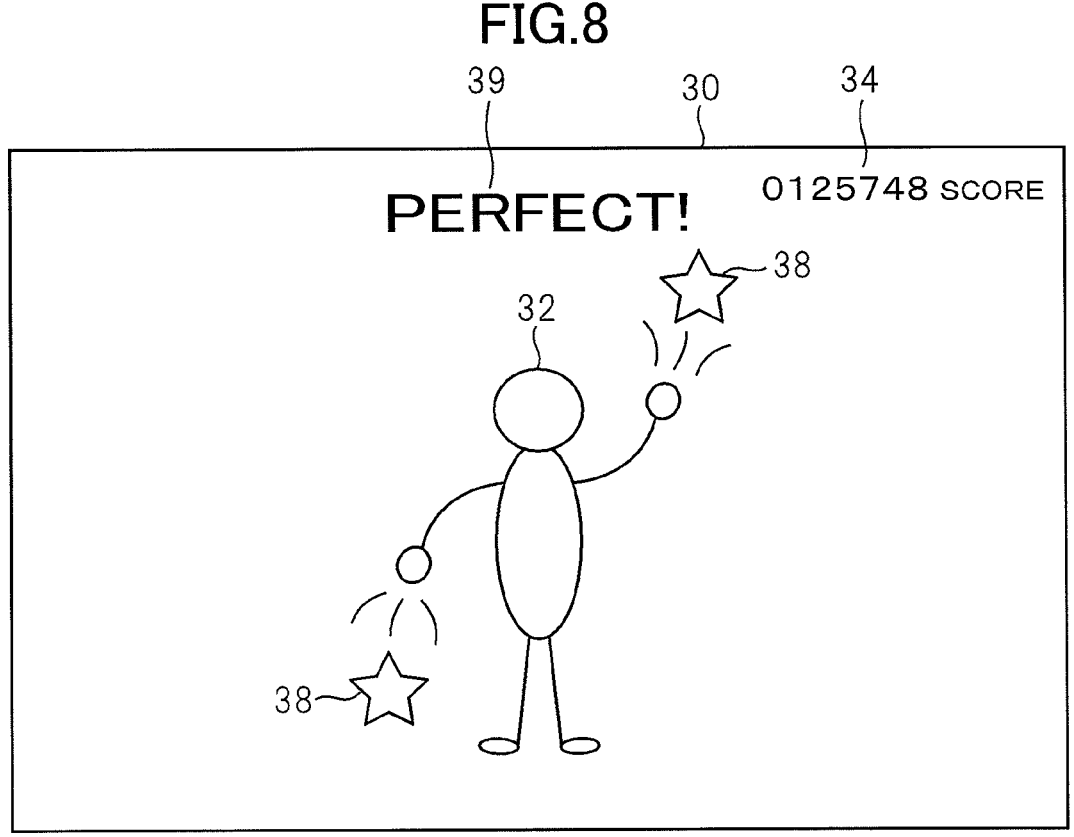
FIG. 8 is a diagram illustrating the game screen displayed in a case where the player obtains an excellent evaluation.

FIG. 8 is a diagram illustrating the game screen 30 displayed in a case where the player obtains an excellent evaluation. As illustrated in FIG. 8, in a case where the player obtains an excellent evaluation, an effect image 38 and an evaluation image 39 indicating an evaluation content are displayed on the game screen 30. Further, for example, in the case where the player obtains an excellent evaluation, such a sound as to express that the mark 36 designed after a bubble bursts is output, and the mark 36 disappears from the game screen 30.

As described above, the player aims to dance in the same manner as the character 32 with the help of content (for example, mark 36) displayed on the game screen 30. On the game device 20, in order to evaluate whether or not the player is dancing in the same manner as the character 32, the position of the body part of the player is determined at two time points. For example, the determination is performed in order to evaluate the action of the player at one time point and in order to perform effect processing at the other time point. Hereinafter, this technology is described in detail.

First, detailed description is given of configurations of the position detecting device 1 and the game device 20.

[4. Configuration of Position Detecting Device]

Figure 9:
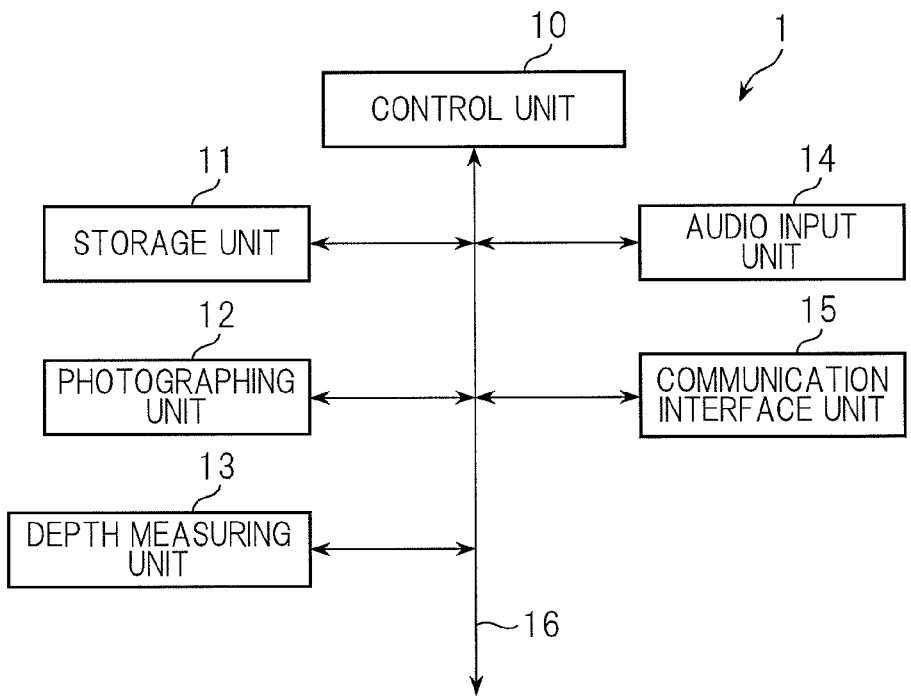
FIG. 9 is a diagram illustrating a hardware configuration of the position detecting device.

FIG. 9 is a diagram illustrating a hardware configuration of the position detecting device 1. As illustrated in FIG. 9, the position detecting device 1 includes a control unit 10, a storage unit 11, a photographing unit 12, a depth measuring unit 13, an audio processing unit 14, and a communication interface unit 15. The respective components of the position detecting device 1 are connected to one another by a bus 16 so as to be able to exchange data thereamong.

The control unit 10 controls the respective units of the position detecting device 1 according to an operating system and various kinds of programs which are stored in the storage unit 11.

The storage unit 11 stores programs and various kinds of parameters which are used for operating the operating system, the photographing unit 12, and the depth measuring unit 13. Further, the storage unit 11 stores a program for generating the player position information based on the photographed image and the depth image.

The photographing unit 12 includes the CCD camera 2 and the like. The photographing unit 12 generates, for example, the photographed image of the player 100. The depth measuring unit 13 includes the infrared sensor 3 and the like. The depth measuring unit 13 generates the depth image based, for example, on the TOF acquired by the infrared sensor 3. As described above, the control unit 10 generates the player position information based on the photographed image generated by the photographing unit 12 and the depth image generated by the depth measuring unit 13 at predetermined time intervals (for example, every 1/60th of a second).

The audio input unit 14 includes, for example, the microphone 4. The communication interface unit 15 is an interface for transmitting various kinds of data, such as the player position information, to the game device 20.

[5. Configuration of Game Device]

Figure 10:
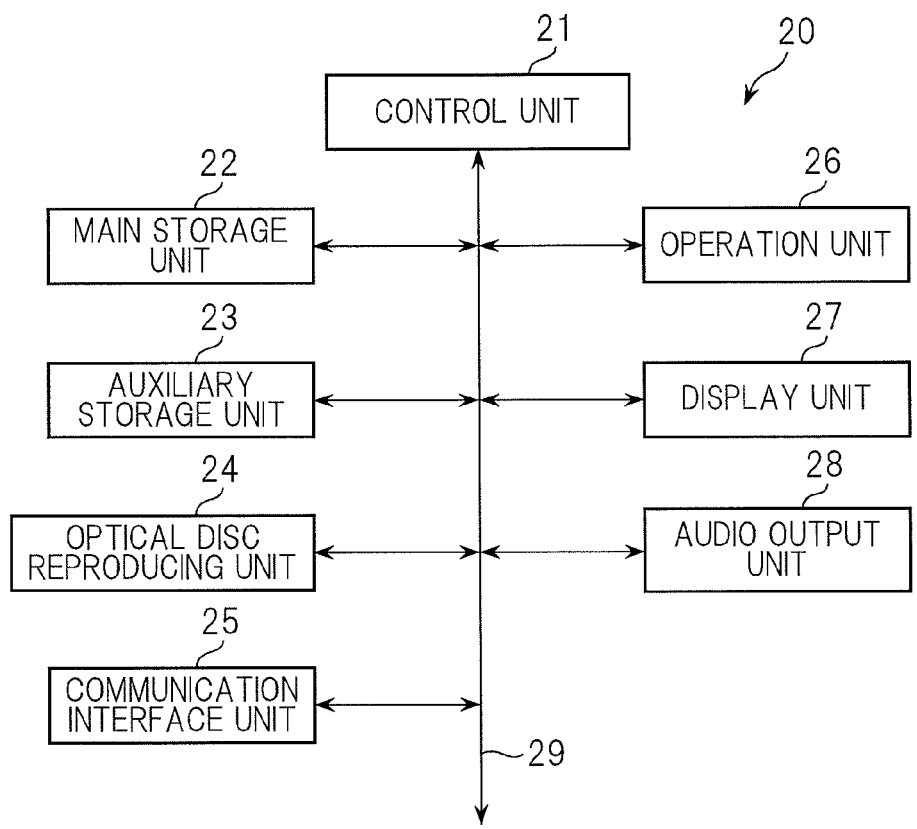
FIG. 10 is a diagram illustrating a hardware configuration of a game device.

FIG. 10 is a diagram illustrating a hardware configuration of the game device 20. As illustrated in FIG. 10, the game device 20 includes a control unit 21, a main storage unit 22, an auxiliary storage unit 23, an optical disc reproducing unit 24, a communication interface unit 25, an operation unit 26, a display unit 27, and an audio output unit 28. The respective components of the game device 20 are connected to one another by a bus 29.

The control unit 21 includes, for example, a CPU, a graphics processing unit (GPU), and a sound processing unit (SPU). The control unit 21 executes various kinds of processing according to an operating system and other programs.

The main storage unit 22 includes, for example, a random access memory (RAM). The auxiliary storage unit 23 includes, for example, a hard disk drive (non-transitory information storage medium). The main storage unit 22 stores programs and data read from the auxiliary storage unit 23 or an optical disc (non-transitory information storage medium). Further, the main storage unit 22 is also used as a work memory for storing data to be required in the course of the processing. Further, for example, the main storage unit 22 temporarily stores the player position information received from the position detecting device 1 in association with a reception time.

The optical disc reproducing unit 24 reads programs and data stored on the optical disc. For example, a game program is stored on the optical disc.

The communication interface unit 25 is an interface for communicatively connecting the game device 20 to a communication network. The game device 20 acquires the player position information from the position detecting device 1 via the communication interface unit 25.

The operation unit 26 is used by the player to perform an operation. The operation unit 26 includes, for example, a game controller, a touch panel, a mouse, or a keyboard. The display unit 27 is, for example, a consumer television set or a liquid crystal display panel. The display unit 27 displays a screen according to an instruction from the control unit 21. The audio output unit 28 includes, for example, a speaker or headphones.

In this embodiment, description is given of a case where the programs and data necessary to execute the game are supplied to the game device 20 via the optical disc. Note that those programs and data may be supplied to the game device 20 via another non-transitory information storage medium (for example, memory card). Alternatively, the programs and data may be supplied from a remote site to the game device 20 via the communication network.

[6. Functions to be Implemented on Game Device]

Figure 11:
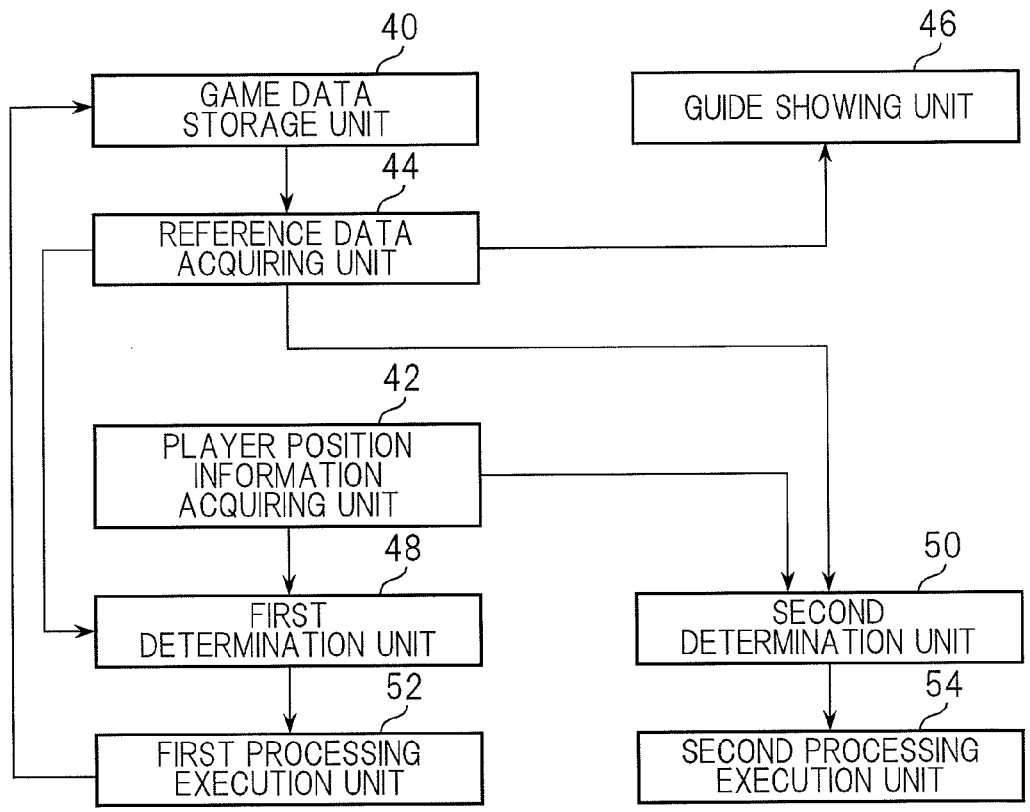
FIG. 11 is a functional block diagram illustrating functions implemented on the game device.

FIG. 11 is a functional block diagram illustrating functions implemented on the game device 20. As illustrated in FIG. 11, on the game device 20, there are implemented a game data storage unit 40, a player position information acquiring unit 42, a reference data acquiring unit 44, a guide showing unit 46, a first determination unit 48, a second determination unit 50, a first processing execution unit 52, and a second processing execution unit 54. Those functions are implemented by the control unit 21 operating according to programs read from the optical disc.

[6-1. Game Data Storage Unit]

The game data storage unit 40 is mainly implemented by the main storage unit 22 and the auxiliary unit 23. The game data storage unit 40 stores information necessary for executing the game. For example, the game data storage unit 40 stores the following data: (1) music track data (data obtained by saving general popular music or the like in a predetermined data format); (2) motion data; (3) reference data; (4) data obtained by storing the player position information in chronological order; and (5) the game situation data (data indicating a situation (including score and elapsed time) of the game being executed).

Note that the music track data, the motion data, and the reference data among the above-mentioned list of data are data prepared by a game creator in advance. The player position information is data acquired from the position detecting device 1, and the game situation data is data generated and updated by a game program. Further, the control unit 21 functions as means for acquiring various kinds of data stored in the game data storage unit 40.

[Motion Data]

First, the motion data is described. The motion data is created by a game producer, for example, based on data generated by performing motion capturing processing on the picture obtained by photographing the action of a dancer. The motion data is, for example, data for identifying the position of each body part of the character 32.

In this embodiment, description is given of a case where the motion data is stored by associating the elapsed time since the reproduction of the music track started (for example, every 1/256th of a bar) with data indicating each body part (skeletal frame) of the character 32 within a game space.

In other words, data indicating a posture of the character 32 is stored in the motion data in chronological order. By locating an object indicating the character 32 in the game space based on the motion data, the game device 20 can perform display control so that the character 32 dances on the game screen 30.

Figure 12:
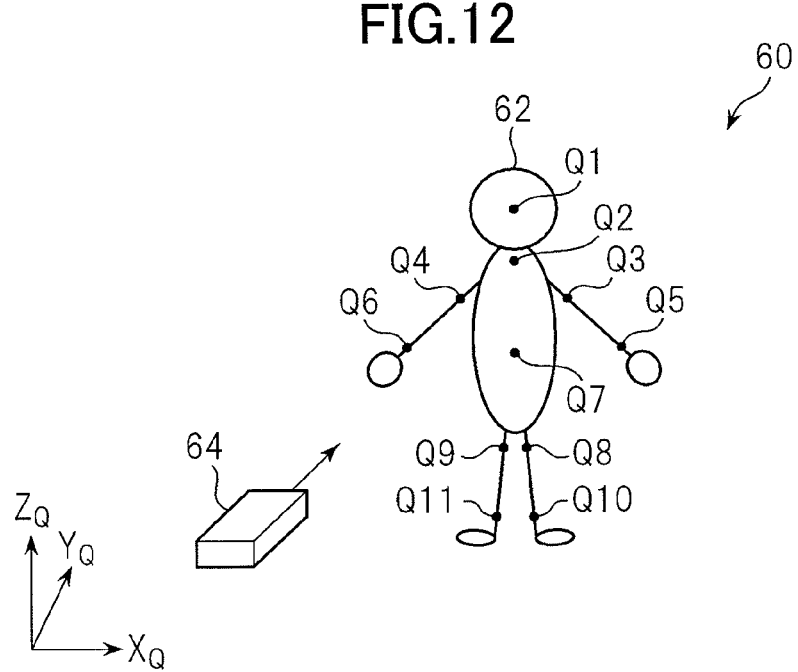
FIG. 12 is a diagram illustrating a game space.

FIG. 12 is a diagram illustrating the game space. As illustrated in FIG. 12, a character object 62 indicating the character 32 and a virtual camera 64 (viewpoint) are located in a game space 60. The character object 62 is structured by including a plurality of polygons. For example, the character object 62 is created based on the data indicating the body parts of the character 32 which is stored in the motion data.

The character object 62 changes so as to show the posture supposed to be adopted by the player. In this embodiment, description is given of a case where the character 32 performs the dance that is left-right reversed to the dance supposed to be performed by the player. For example, when the player is supposed to place his right hand in a high position, an object indicating a left hand of the character 32 within the character object 62 is located in the high position. In other words, in the motion data, the position of the body part of the character 32 is defined so that the character 32 performs the dance that is left-right reversed to the dance supposed to be performed by the player.

Displayed on the game screen 30 is an image indicating how the game space 60 is viewed from the virtual camera 64. Information indicating the position and a line-of-sight direction of the virtual camera 64 may be a fixed value, or may vary according to the game program or the operation performed by the player. The information indicating the position and the line-of-sight direction of the virtual camera 64 is stored in, for example, the game situation data. Further, the motion data and the music track data are synchronously reproduced so that the character 32 dances in tune with the music track.

[Reference Data]

Next, the reference data is described. The reference data is data obtained by associating information relating to a reference time point set within a reproduction time of the music track data with information relating to a reference position in which the body part of the player is supposed to be placed at the reference time point. The reference time point represents a time point at which the game device 20 determines (evaluates) the action of the player. The action of the player performed within a reproduction period of the music track data is evaluated based on the reference data. The wording "within the reproduction period of the music track data" means within a period from the start point of the music track until the end point thereof.

In this embodiment, description is given of a case where the reference data includes position data for determination and setting data. The position data for determination is data indicating a position in which each body part of the player is supposed to be placed at each time point after the reproduction of the music track starts. For example, the elapsed time since the reproduction of the music track started and the position (three-dimensional coordinates) in which the body part of the player is supposed to be placed after the elapsed time are stored in the position data for determination in association with each other. In the same manner as the motion data, the position data for determination is created by a game producer based on the data generated by performing the motion capturing processing on the picture obtained by photographing the action of a dancer. The position data for determination is compared with the position of the body part of the player indicated by the player position information.

Further, in this embodiment, description is given of a case where the position data for determination is expressed by a coordinate system based on a representative point which is set in the player. For example, the three-dimensional coordinates stored in the position data for determination are expressed by the coordinate system with the representative point set as an origin thereof. In other words, position coordinates of each body part of the player stored in the position data for determination indicate a positional relation between the position in which each body part of the player is supposed to be placed and the position of the representative point.

Note that in this embodiment, the representative point is set to the back P7. In this case, the back P7 is set as the origin, and the three-dimensional coordinates indicating a position relative to the back P7 are stored in the position data for determination. In the case of evaluating the action of the player, the game device 20 expresses the player position information by the coordinate system based on the representative point. For example, the position data for determination is expressed by the coordinate system having the back P7 set as the origin, and hence the three-dimensional coordinates included in the player position information are also expressed by the coordinate system having the back P7 set as the origin.

Note that in this embodiment, description is given of the case where the representative point is the back P7, but the representative point is not limited to the back P7 as long as the representative point is set for the player and the character 32. For example, the representative point may be the head P1 or the like.

Further, in this embodiment, the character 32 performs the dance that is left-right reversed to the dance supposed to be performed by the player, and hence a fixed relation (left-right reversed relation) is maintained between the positions of the head P1, the shoulder P2, the left upper arm P3, the right upper arm P4, the left lower arm P5, the right lower arm P6, the back P7, the left thigh P8, the right thigh P9, the left shin P10, and the right shin P11 of the player, which are indicated by the position data for determination, and the positions of a head Q1, a shoulder Q2, a left upper arm Q3, a right upper arm Q4, a left lower arm Q5, a right lower arm Q6, a back Q7, a left thigh Q8, a right thigh Q9, a left shin Q10, and a right shin Q11 of the character 32, which are illustrated in FIG. 12.

Next, the setting data is described. The setting data is data for identifying the reference time point and the body part of the player to be determined by the game device 20 at the reference time point.

Figures 13, 14:
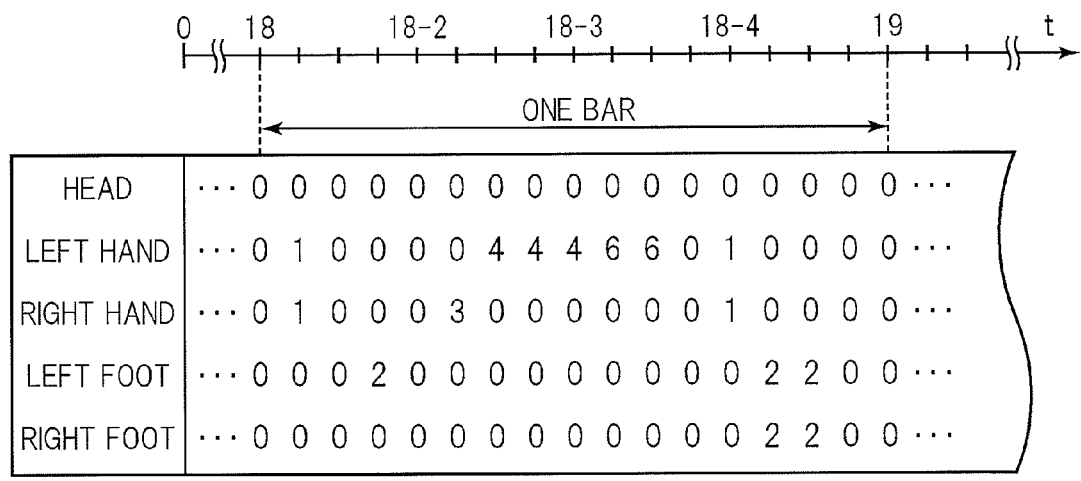
FIG. 13 is a diagram illustrating an example of setting data.
FIG. 14 is a diagram illustrating types of a determination method.

FIG. 13 is a diagram illustrating an example of the setting data. A t-axis illustrated in FIG. 13 represents a time axis. The t-axis indicates the elapsed time since the reproduction of the music track started. For example, the setting data indicates the body part of the player to be determined by the game device 20 every predetermined bar (for example, $\frac{1}{16}$th of a bar). In this embodiment, description is given of a case where five body parts of a head, a left hand (for example, left lower arm), a right hand (for example, right lower arm), a left foot (for example, left shin), and a right foot (for example, right shin) are defined in the setting data.

As illustrated in FIG. 13, at each time point in units of $\frac{1}{16}^{th}$ of a bar, it is expressed by the numerical values "0" to "7" whether or not the game device 20 is to determine the dance of the player. The values in "head", "left hand", "right hand", "left foot", and "right foot" which are stored in the setting data indicate whether or not the game device 20 is to determine the positions of the head, the left hand, the right hand, the left foot, and the right foot of the player, respectively. Further, a method of determining the action of the player by the game device 20 differs in type depending on the numerical value of the value within the setting data.

FIG. 14 is a diagram illustrating types of a determination method. As illustrated in FIG. 14, in this embodiment, the method of determining the action of the player by the game device 20 differs in type depending on the value stored in the setting data. The value "0" stored in the setting data indicates that the game device 20 is not to determine the action of the player at the corresponding time point. In other words, all the body parts stored in the setting data whose values are "0" indicate that the corresponding time point is not the reference time point.

The body part stored in the setting data whose value is any one of "1" to "7" indicates that there is a body part of the player to be determined by the game device 20. Hereinafter, this body part is referred to as a determination subject body part. In other words, any one of "1" to "7" stored in the setting data indicates that the corresponding time is the reference time point. In this embodiment, as illustrated in FIG. 14, the method of determining the action of the player by the game device 20 is classified into the following seven types. (1) Ripple: The game device 20 determines whether or not the player is moving their hand in the same manner as the character 32. (2) Step: The game device 20 determines whether or not the player is moving their foot in the same manner as the character 32. (3) Pose: The game device 20 determines whether or not the player is adopting the same pose as the character 32 by using their whole body. (4) Lock: The game device 20 determines whether or not the player has been maintaining their body part in the same position as the character 32 for a predetermined time period. (5) Solid: The game device 20 determines whether or not the player has been shaking their hand in the same manner as the character 32 for a predetermined time period. (6) Stream: The game device 20 determines whether or not the player has been moving their hand in the same manner as the character 32 for a predetermined time period. (7) Gesture: The game device 20 determines whether or not the player has been adopting the same pose as the character 32 by using their whole body or partial body part for a predetermined time period.

For example, if there is a body part whose value is "1", "2", "4", "5", or "6" in the setting data, the game device 20 determines the action of the body part (head, left hand, right hand, left foot, or right foot) of the player having the above-mentioned value based on the above-mentioned type. Further, for example, if there is a body part whose value is "3" or "7" in the setting data, the game device 20 determines the action of the whole body or partial body part of the player based on the above-mentioned type.

Note that in this embodiment, description is given of the case where such action as described above is performed by the player, but the type of the determination method performed by the game device 20 is not limited to the above-mentioned example as long as the type of the determination method performed by the game device 20 relates to an action based on the dance of the character 32.

[6-2. Player Position Information Acquiring Unit]

The player position information acquiring unit 42 is implemented mainly by the control unit 21. The player position information acquiring unit 42 acquires the player position information relating to the position of the body part of the player. The player position information includes, for example, the three-dimensional coordinates of the body part of the player within the three-dimensional space (real space). The player position information acquiring unit 42 acquires the player position information from the position detecting device 1.

In this embodiment, description is given of a case where the player position information includes information relating to the position of a representative position (in other words, representative point, for example, back P7) of the player and the position of the body part of the player. The acquired player position information is, for example, stored in the game data storage unit 40 in association with an acquisition time.

[6-3. Reference Data Acquiring Unit]

The reference data acquiring unit 44 is implemented mainly by the control unit 21. The reference data acquiring unit 44 acquires the reference data from means for storing the reference data, the reference data being obtained by associating information relating to the reference time point with information relating to the reference position in which the body part of the player is supposed to be placed at the reference time point.

In this embodiment, the reference data acquiring unit 44 acquires the reference data including the position data for determination and the setting data. Stored in the position data for determination are the elapsed time since the reproduction of the music track started and the three-dimensional coordinates (for example, three-dimensional coordinates of the body part of the character 32) at which the body part of the player is supposed to be positioned after the elapsed time. In the setting data, the reference time point is associated with the body part of the player to be determined by the game device.

[6-4. Guide Showing Unit]

The guide showing unit 46 is implemented mainly by the control unit 21. The guide showing unit 46 shows the player the reference time point and the reference position based on the reference data. In this embodiment, description is given of a case where the guide showing unit 46 displays a guide image (for example, mark 36) for showing the reference time point and the reference position based on the setting data.

For example, when the time at which the value stored in the setting data is any one of "1" to "7" (in other words, the reference time point) is approaching, the guide showing unit 46 identifies the position in which the mark 36 is to be displayed based on the position data for determination, and displays the mark 36 in this position.

For example, when the reference time point at which the value stored in the setting data is "1" is approaching, the game device 20 displays the marks 36, as illustrated in FIG. 7, near the body parts of the character 32 (for example, left hand and right hand) in order to show the player that the determination for Ripple is to be performed. The mark 36 is displayed based on, for example, the three-dimensional coordinates (for example, left lower arm P5 and right lower arm P6) indicated by the position data for determination at this reference time point.

Note that the method of identifying the position in which the mark 36 is to be displayed is not limited to the above-mentioned example. Alternatively, for example, the mark 36 may be displayed based on a first determination area 70 described later, or the mark 36 may be displayed based on the position of the character object 62.

When the time at which the value stored in the setting data is "2" or "4" is approaching, in the same manner as the above description, the game device 20 displays the mark 36 near the hand, the foot, or the like of the character 32 in order to perform the determination for Step or Lock, respectively.

Figure 15:
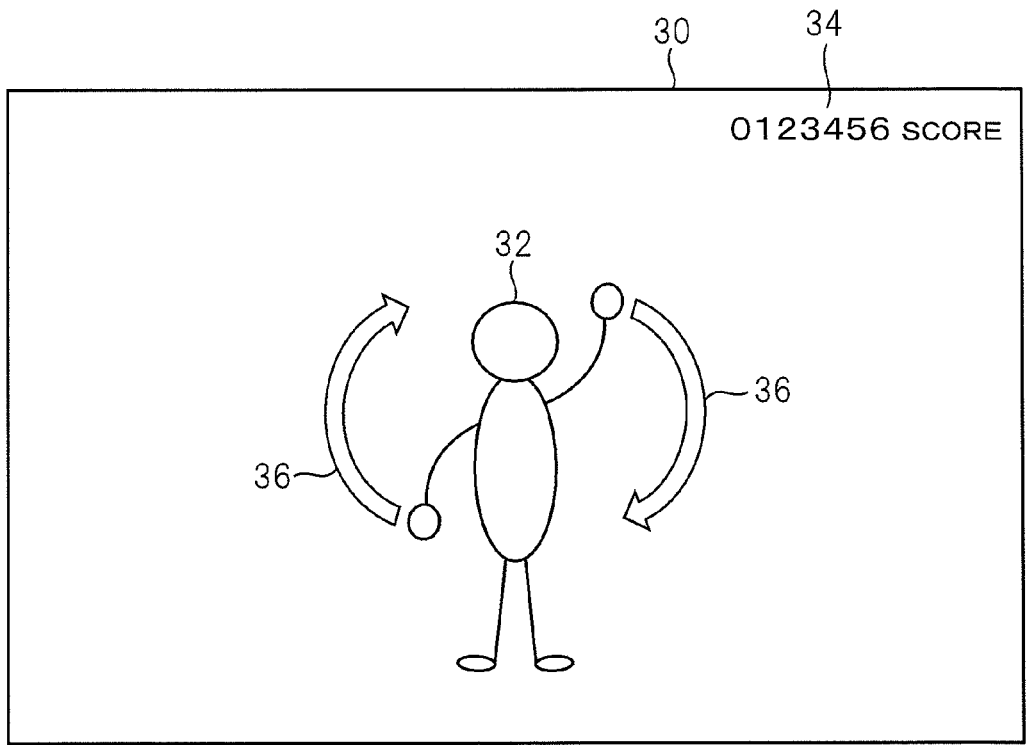
FIG. 15 is a diagram illustrating an example of the game screen displayed when a reference time point at which the game device is to perform determination for Solid or Stream is approaching.

FIG. 15 is a diagram illustrating an example of the game screen displayed when the reference time point at which the game device 20 is to perform the determination for Solid or Stream is approaching. As illustrated in FIG. 15, a mark 36 that shows the movement of the hand of the character 32 is displayed. For example, when the reference time point at which the game device 20 is to perform the determination for Solid or Stream is approaching, the position in which the mark 36 is to be displayed is identified based on the three-dimensional coordinates indicated by the position data for determination, and the mark 36 is displayed in this position.

Figure 16:
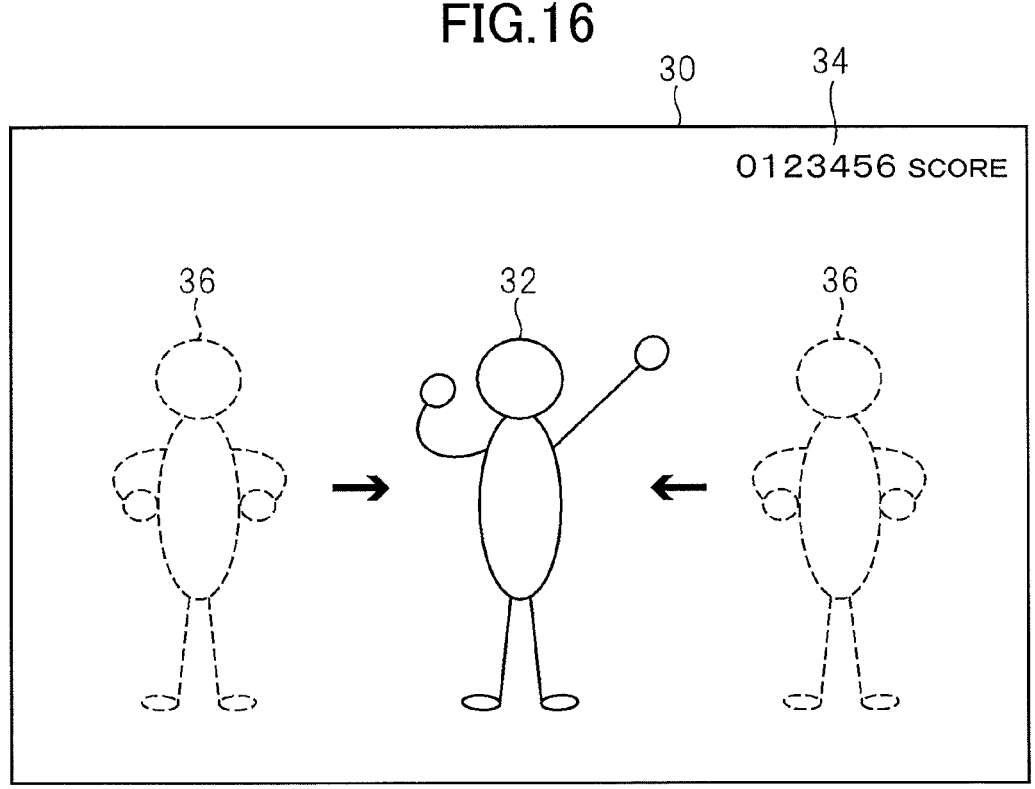
FIG. 16 is a diagram illustrating an example of the game screen displayed when the reference time point at which the game device is to perform determination for Pose or Gesture is approaching.

FIG. 16 is a diagram illustrating an example of the game screen displayed when the reference time point at which the game device 20 is to perform the determination for Pose or Gesture is approaching. As illustrated in FIG. 16, a mark 36 showing the pose of the character 32 is displayed. For example, in the case of the example illustrated in FIG. 16, the marks 36 approach the character 32 from the left and right. The time at which the marks 36 coincide with the character 32 becomes the reference time point.

For example, when the reference time point at which the game device 20 is to perform the determination for Pose or Gesture is nearing, the pose of the character 32 is identified based on the three-dimensional coordinates of the character object 62 indicated by the motion data. For example, the marks 36 are displayed by locating objects indicating this pose on the left and right of the character object 62 so as to sandwich the character object 62 therebetween. A distance between this object and the character object 62 is controlled based on, for example, a difference between the reference time point and the present time.

Note that the guiding method performed by the guide showing unit 46 is not limited to the above-mentioned example as long as the guide showing unit 46 shows the player the reference time point and the reference position based on the setting data. For example, the guide showing unit 46 may cause a sound to be output so as to show the player the reference time point and the reference position. In addition, for example, information that identifies an image of the mark 36, a display position of the mark 36, and a time at which the mark 36 is to be displayed may be provided in advance in association with one another.

[6-5. First Determination Unit]

The first determination unit 48 is implemented mainly by the control unit 21. The first determination unit 48 determines whether or not the reference position and the position of the body part of the player indicated by the player position information acquired at a first determination time point, which is a time point set based on the reference time point and which is earlier than the reference time point, satisfy a first criterion relating to a positional displacement between the position of the body part and the reference position. In this embodiment, description is given of a case where the first determination time point is any one of time points after the time point earlier than the reference time point by a predetermined time before the reference time point.

The first criterion is a criterion indicating how much the position of the body part of the player is displaced from the reference position at the first determination time point, for example, a criterion relating to a positional displacement amount (distance or interval) between the position of the body part of the player and the reference position.

In this embodiment, description is given of a case where the first determination unit 48 determines whether or not the first criterion is satisfied by determining whether or not the position of the body part of the player indicated by the player position information acquired at the first determination time point is included in a first determination area that is set based on the reference position. For example, in the case where the determination for Ripple, Step, Lock, Solid, or Stream is performed, the determination using the first determination area is performed as described above.

The first determination area is set based on the position (three-dimensional coordinates) of the determination subject body part. In this embodiment, in a case where the first determination time point arrives, the first determination area is set based on the position of the determination subject body part. The first determination area is set so as to include the determination subject body part.

Figure 17:
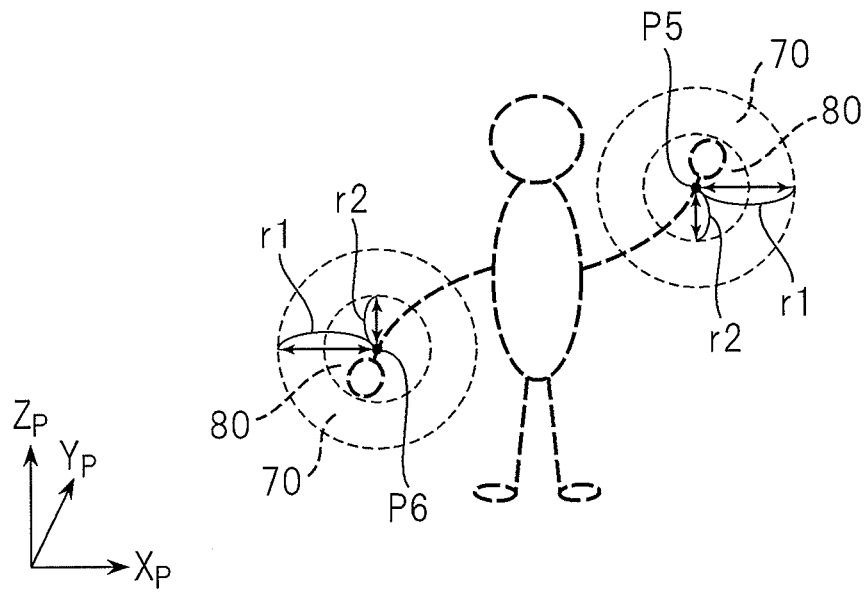
FIG. 17 is a diagram illustrating a first determination area and a second determination area that are set according to an embodiment of the present invention.

FIG. 17 is a diagram illustrating the first determination area and a second determination area (described later) which are set in this embodiment. The example of FIG. 17 illustrates the first determination area 70 set in the case where the reference time point at which the game device 20 is to perform the determination for Ripple arrives. As illustrated in FIG. 17, for example, the first determination areas 70 are set in the positions indicating both hands of the character 32 among the character objects 62.

For example, a sphere having a predetermined radius r1 with the three-dimensional coordinates of the determination subject body part set as its center is set as the first determination area 70. For example, in a case where the determination subject body parts are the right hand and the left hand, with reference to the sets of three-dimensional coordinates of the left hand and the right hand (for example, sets of three-dimensional coordinates of the left lower arm P5 and the right lower arm P6) of the player stored in the position data for determination, the sphere having the predetermined radius r1 with each of the sets of the three-dimensional coordinates set as its center is set as the first determination area 70.

In this embodiment, description is given of a case where the first determination unit 48 determines whether or not the position of the body part of the player is included in the first determination area 70 based on the positional relation between the representative position (for example, back P7) of the player and the position of the body part of the player and the positional relation between the representative position (for example, back P7) of the player and the first determination area 70. In other words, the first determination unit 48 evaluates the action of the player by superposing the position of each body part of the player on that of the character 32.

Here, the determination method performed by the first determination unit 48 is described by taking as an example a case where the determination subject body part is the right lower arm P6. In this case, the first determination area 70 is set around the position in which the right lower arm P6 of the player indicated by the position data for determination is to be placed. In the case where the first determination time point arrives, the first determination unit 48 expresses the three-dimensional coordinates indicated by the player position information by the coordinate system with the back P7 set as the origin. In other words, the position of the back P7 of the player indicated by the player position information is superposed on the position of the back P7 of the player indicated by the position data for determination.

Then, it is determined whether or not the coordinates of the right lower arm P6 indicated by the player position information are included in the first determination area 70. For example, it is determined whether or not a distance between the coordinates of the right lower arm P6 of the player that are subjected to coordinate conversion and the coordinates of the right lower arm P6 indicated by the position data for determination is equal to or smaller than the predetermined radius r1. If the coordinates of the right lower arm P6 of the player are included in the first determination area 70, the action of the player is evaluated highly, and effect processing is executed. If the coordinates of the right lower arm P6 of the player are not included in the first determination area 70, the action of the player is evaluated poorly, and the effect processing is not executed.

Note that the determination method performed by the first determination unit 48 by using the first determination area 70 is not limited to the above-mentioned example as long as the first determination unit 48 evaluates the action of the player based on the position of each body part of the player and the first determination area 70. For example, the action of the player may be evaluated based on a distance between the position of each body part of the player and the center point of the first determination area 70.

Further, the first determination unit 48 may determine whether or not the first criterion is satisfied based on whether or not the number of body parts, whose positional displacement amount between the position of the body part of the player indicated by the player position information acquired at the first determination time point and the reference position is within a reference range, is within a first reference range. For example, in the case where the determination for Pose or Gesture is performed, the determination using the first reference range is performed as described above.

In this case, the first determination unit 48 calculates the positional displacement amount (distance) between the position of the body part of the player and the reference position. Then, it is determined whether or not the positional displacement amount is within a predetermined reference range (first reference distance). For example, it is determined whether or not the first criterion is satisfied based on whether or not the number of body parts, whose positional displacement amount is within the predetermined reference range, is equal to or larger than a lower limit value (first reference number) of the first reference range (for example, equal to or larger than eight or equal to or larger than 80% of all the body parts).

[8-6. Second Determination Unit]

The second determination unit 50 is implemented mainly by the control unit 21. The second determination unit 50 determines whether or not the reference position and the position of the body part of the player indicated by the player position information acquired at a second determination time point, which is a time point set based on the reference time point and which is later than the first determination time point, satisfy a second criterion which is a criterion relating to the positional displacement between the position of the body part and the reference position and which indicates a smaller positional displacement than the positional displacement indicated by the first criterion.

The second determination time point is a time point later than the first determination time point among time points within a determination period. The determination period represents a period after the time point earlier than the reference time point by a predetermined time (first time) until the time point later than the reference time point by a predetermined time (second time). The length of the first time and the length of the second time may be the same or different from each other. In this embodiment, description is given of a case where the second determination time point is any one of time points after the reference time point before the time point later than the reference time point by a predetermined time. For example, because the second determination time point is later than the reference time point, even if it takes time to generate the player position information, it is possible to accurately determine the action of the player at the reference time point.

Further, the positional displacement indicated by the second criterion is smaller in extent of displacement (positional displacement amount) than the positional displacement indicated by the first criterion. Therefore, it is more difficult for the player to obtain an excellent evaluation in the determination based on the second criterion than in the determination based on the first criterion.

In this embodiment, description is given of a case where the second determination unit 50 determines whether or not the second criterion is satisfied by determining whether or not the position of the body part of the player indicated by the player position information acquired at the second determination time point is included in the second determination area which is an area set based on the reference position and which is covered by the first determination area.

For example, a second determination area 80 is set so that the entirety or part of the second determination area 80 is included in the first determination area 70. In other words, the second determination area 80 is set in a position whose distance from the determination subject body part is closer than the first determination area 70.

The second determination area 80 is set, for example, to have a spherical shape so as to be covered by the first determination area 70. For example, in the case where the determination subject body parts are the right hand and the left hand, with reference to sets of three-dimensional coordinates of the left lower arm P5 and the right lower arm P6 of the position data for determination, a sphere having a predetermined radius r2 (<r1) with each of the sets of the three-dimensional coordinates set as its center is set as the second determination area 80.

Note that in this embodiment, description is given of the case where the first determination area 70 and the second determination area 80 are areas having a spherical shape, but the shapes of the first determination area 70 and the second determination area 80 are not limited to the spherical shape. The first determination area 70 and the second determination area 80 may have any shape as long as the shape allows a comparison as to the positional relation with respect to the determination subject body part of the player at the reference time point or within the determination period. Alternatively, for example, the first determination area 70 and the second determination area 80 may be a rectangular parallelepiped or the like.

Further, information for identifying the positions and sizes of the first determination area 70 and the second determination area 80 (for example, information indicating the center points and radii of the spheres) may be stored in, for example, the game situation data. Further, the first determination area 70 and the second determination area 80 may be set in the three-dimensional space indicated by the player position information or may be set in the game space 60.

The determination method performed by the second determination unit 50 is the same as the determination method performed by the first determination unit 48. In other words, in a case where the second determination time point arrives, the second determination unit 50 subjects the three-dimensional coordinates indicated by the player position information to coordinate conversion so that the three-dimensional coordinates of the back P7 indicated by the player position information coincide with the three-dimensional coordinates of the back P7 of the player indicated by the position data for determination.

Then, it is determined whether or not the coordinates of the right lower arm P6 of the player are included in the second determination area 80. If the coordinates of the right lower arm P6 of the player are included in the second determination area 80, the action of the player is evaluated highly, and the score is increased. If the coordinates of the right lower arm P6 of the player are not included in the second determination area 80, the action of the player is evaluated poorly, and the score is not increased.

Note that the above description is given of the case where the first determination unit 48 and the second determination unit 50 perform the determination for Ripple, but in the same manner as in FIG. 17, the first determination area 70 and the second determination area 80, each of which has a spherical shape having a predetermined radius with the three-dimensional coordinates of the determination subject body part set as its center, are also set when the reference time point at which the determination for Step or Lock is to be performed is approaching. Further, also in the case where the first determination unit 48 and the second determination unit 50 perform the determination for Solid or Stream, the first determination area 70 and the second determination area 80 may be set.

Figure 18:
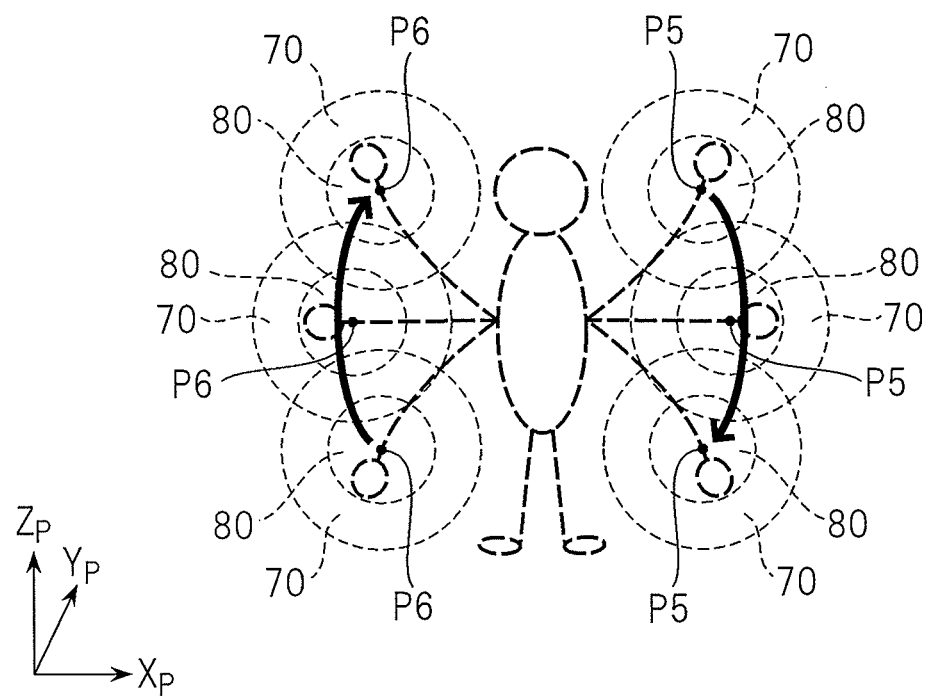
FIG. 18 is a diagram illustrating an example of the first determination area and the second determination area that are set when the reference time point at which the game device is to perform the determination for Solid or Stream is approaching.

FIG. 18 is a diagram illustrating an example of the first determination area 70 and the second determination area 80 that are set when the reference time point at which the game device 20 is to perform the determination for Solid or Stream is approaching. When the reference time point is approaching, the first determination area 70 and the second determination area 80 are set based on the three-dimensional coordinates of the determination subject body part. As illustrated in, for example, FIG. 18, a plurality of first determination areas 70 and second determination areas 80 are set because the determination for Solid or Stream is performed over a predetermined time period and the position of the determination subject body part changes.

The second determination unit 50 may determine whether or not the second criterion is satisfied based on whether or not the number of body parts, whose positional displacement amount between the position of the body part of the player indicated by the player position information acquired at the second determination time point and the reference position is within the reference range, is within a second reference range having a lower limit value that is larger than the lower limit value of the first reference range. For example, in the case where the determination for Pose or Gesture is performed, the determination using the second reference range is performed as described above.

In this case, the second determination unit 50 calculates the positional displacement amount (distance) between the position of the body part of the player and the reference position. Then, it is determined whether or not the positional displacement amount is within a predetermined reference range (second reference distance, which may be the same as the first reference distance). For example, it is determined whether or not the second criterion is satisfied based on whether or not the number of body parts, whose positional displacement amount is within the predetermined reference range, is equal to or larger than the lower limit value (for example, second reference number that is larger than first reference number) of the second reference range (for example, equal to or larger than ten or equal to or larger than 90% of all the body parts).

Note that in the case where the first determination time point or the second determination time point at which the determination for Pose or Gesture is to be performed arrives, in the same manner as the other actions, the first determination areas 70 and the second determination areas 80 may be set based on the three-dimensional coordinates of the determination subject body part (whole body or partial body part). For example, in the case where the first determination time point or the second determination time point at which the determination for Pose is to be performed arrives, the first determination area 70 and the second determination area 80 of the whole body (for example, eleven body parts) may be set.

[6-7. First Processing Execution Unit]

The first processing execution unit 52 performs processing relating to effects on the game based on a determination result from the first determination unit 48. The processing relating to effects represents, for example, processing (display effect processing) relating to an image displayed on the display unit 27 or processing (sound effect processing) relating to a sound output from the audio output unit 28. For example, the first processing execution unit 52 executes the effect processing at the reference time point.

For example, in the display effect processing, display processing for informing the player of the determination result from the first determination unit 48 is performed by the display unit 27. For example, as the display effect processing, the display processing such as processing for displaying the effect image 38, processing for causing the game screen 30 to flash, or processing for changing the brightness of the game screen 30 is executed.

In the sound effect processing, audio output processing for informing the player of the determination result from the first determination unit 48 is executed by the audio output unit 28. For example, as the sound effect processing, the audio output processing such as a processing for outputting a sound to express that the mark 36 bursts or a processing for outputting a voice to be uttered by the character 32 is executed.

[6-8. Second Processing Execution Unit]

The second processing execution unit 54 is implemented mainly by the control unit 21. The second processing execution unit 54 performs processing relating to the evaluation of the player based on the determination result from the second determination unit 50. The processing relating to the evaluation of the player represents processing performed in order to determine how good or bad the result of the game played by the player is. In other words, for example, the processing relating to the evaluation of the player represents processing for updating information indicating the result of the game played by the player, for example, processing for changing the score of the player. The second processing execution unit 54 may execute processing for deciding a game result of the player based on the determination result from the second determination unit 50.

[7. Processing to be Executed on Game Device]

FIG. 19 is a flowchart illustrating an example of processing executed on the game device 20. The processing of FIG. 19 is executed by the control unit 21 operating according to programs read from the optical disc.

First, as illustrated in FIG. 19, the control unit 21 reproduces the music track based on the music track data (S101). The control unit 21 starts the dance of the character 32 based on the motion data (S102). In S102, the character object 62 is located in the game space 60 based on the motion data. Then, an image indicating how the character object 62 looks when viewed from the virtual camera 64 is displayed as the game screen 30. Note that the music track data and the motion data are synchronously reproduced so that the character 32 dances in tune with the music track.

The control unit 21 determines, with reference to the setting data, whether or not the current time point is within a guide showing period (S103). The guide showing period represents a period during which the reference position and the reference time point are to be shown to the player, for example, a period from a time point earlier than the reference time point by a predetermined time (for example, one bar) until the reference time point. If the current time point is out of the guide showing period (S103; N), the processing advances to S112.

If it is determined that the current time point is within the guide showing period (S103; Y), the control unit 21 displays the mark 36 on the game screen 30 (S104). In S104, with reference to, for example, the setting data and the position data for determination within the motion data, the mark 36 is displayed in the position of the determination subject body part of the character 32. Image data on the mark 36 may be stored in advance in association with a display position.

The control unit 21 determines whether or not the current time point is the first determination time point (S105). For example, it is determined whether or not the elapsed time of the music track and the dance reaches the time point earlier than the reference time point by a predetermined time (for example, $1/8^{th}$ of a bar before the reference time).

If it is determined that the current time point is not the first determination time point (S105; N), the processing advances to S108. If it is determined that the current time point is the first determination time point (S105; Y), the control unit 21 determines whether or not the positional relation between the position of the body part of the player indicated by the player position information and the reference position stored in the reference data satisfies the first criterion (S106). In S106, processing contents differ depending on, for example, the type of the determination method for the action of the player.

For example, if the determination for Ripple, Step, Lock, Solid, or Stream is performed, first, the determination subject body part is identified with reference to the setting data. Subsequently, the three-dimensional coordinates of the determination subject body part at the reference time point are acquired with reference to the position data for determination. Then, the sphere having the predetermined radius r1 with the three-dimensional coordinates at its center is set as the first determination area 70. The control unit 21 determines, with reference to the player position information at the first determination time point, whether or not the determination subject body part of the player is placed within the first determination area 70.

On the other hand, in the case where the determination for Pose or Gesture is performed, first, the determination subject body part (for example, whole body) is identified with reference to the setting data. Subsequently, the three-dimensional coordinates of the determination subject body part (for example, whole body) at the reference time point are acquired with reference to the position data for determination. Then, the control unit 21 determines whether or not the number of body parts, whose distance between the position of the body part indicated by the player position information at the first determination time point and the position indicated by the position data for determination is within a reference distance, is within the first reference range (for example, equal to or larger than eight).

If it is determined that the first criterion is not satisfied (S106; N), the processing advances to S108. If it is determined that the first criterion is satisfied (S106; Y), the control unit 21 performs the effect processing (S107). For example, display processing and audio output processing to express that the mark 36 designed after a bubble bursts and disappears are executed at the reference time point. In other words, the determination of S106 is executed at the first determination time point earlier than the reference time point by the predetermined time, and hence the effect processing can be executed at the reference time point.

Subsequently, the control unit 21 determines whether or not the current time point is the second determination time point (S108). For example, it is determined whether or not the elapsed time of the music track and the dance reaches the time point later than the reference time point by a predetermined time (for example, $1/8^{th}$ of a bar after the reference time). If it is determined that the current time point is not the second determination time point (S108; N), the processing advances to S112.

If it is determined that the current time point is the second determination time point (S108; Y), the control unit 21 determines whether or not the positional relation between the position of the body part of the player indicated by the player position information and the reference position indicated by the reference data satisfies the second criterion (S109). In S109, in the same manner as in S106, processing contents differ depending on, for example, the type of the determination method for the action of the player.

For example, if the determination for Ripple, Step, Lock, Solid, or Stream is performed, first, the determination subject body part is identified with reference to the setting data. Subsequently, the three-dimensional coordinates of the determination subject body part at the reference time point are acquired with reference to the position data for determination. Then, the sphere having the predetermined radius r2 with the three-dimensional coordinates at its center is set as the second determination area 80. The control unit 21 determines, with reference to the player position information at the second determination time point, whether or not the determination subject body part of the player is placed within the second determination area 80.

On the other hand, in the case where the determination for Pose or Gesture is performed, first, the determination subject body part (for example, whole body) is identified with reference to the setting data. Subsequently, the three-dimensional coordinates of the determination subject body part (for example, whole body) at the reference time point are acquired with reference to the position data for determination. Then, the control unit 21 determines whether or not the number of body parts, whose distance between the position of the body part indicated by the player position information at the first determination time point and the position indicated by the position data for determination is within a reference distance, is within the second reference range (for example, equal to or larger than eight).

If it is determined that the second criterion is not satisfied (S109; N), the control unit 21 displays an evaluation content (message) (S110). In S110, the evaluation image 39 is displayed on the game screen 30. Note that the evaluation image 39 may be caused to differ according to the determination result obtained in S106. For example, if the first criterion is satisfied in S106, the evaluation image 39 indicating the characters "GOOD" may be displayed, and if the first criterion is not satisfied in S106, the evaluation image 39 indicating the characters "BOO" may be displayed.

If it is determined that the second criterion is satisfied (S109; Y), the control unit 21 increases the score and displays the evaluation content (message) (S111). In S111, the evaluation image 39 is displayed on the game screen 30. Note that the evaluation image 39 may be caused to differ according to the displacement between the reference time point and the second determination time point. For example, if the displacement between the reference time point and the second determination time point is within the predetermined time, the evaluation image 39 indicating the characters "PERFECT" may be displayed, and if the displacement between the reference time point and the second determination time point is not within the predetermined time, the evaluation image 39 indicating the characters "GREAT" may be displayed.

The control unit 21 determines whether or not an end condition is satisfied (S112). The end condition may be any condition as long as the condition is previously defined in order to end the present processing. For example, the end condition may be a condition indicating whether or not to end the music track and the dance, or may be a predetermined game over condition.

If the end condition is satisfied (S112; Y), the processing is brought to an end. If the end condition is not satisfied (S112; N), the processing returns to S103.

The game device 20 described above determines the positions of the body part of the player at the first determination time point and the second determination time point. The former determination result is used for the effect processing, and the latter determination result is used for the processing for evaluating the player. Therefore, for example, even if it takes time to generate the player position information due to image analysis, the effect processing can be executed at the reference time point, and the action of the player at the reference time point can be evaluated with accuracy, which prevents stress from being placed on the player.

Further, at the second determination time point, the determination is performed by the second criterion indicating the positional displacement amount smaller than the positional displacement amount indicated by the first criterion for the determination performed at the first determination time point, and hence it is possible to alleviate the stress placed on the player and ensure a difficulty level of the game that prevents a high result from being easily obtained.

Note that in this embodiment, description is given of the case where the first processing execution unit 52 executes the effect processing at the reference time point, but the effect processing only needs to be executed at such a time point that the player hardly notices a time lag between an operation time expected by the player and an operation time within the game. For example, the effect processing may be executed at a time point that is earlier or later than the reference time point by a predetermined time (for example, 0.1 seconds before the reference time point or 0.1 seconds after the reference time point).

The present invention is not limited to the embodiment and modified example described above. Various modifications may be made as appropriate without departing from the spirit of the present invention.

(1) For example, the shapes of the first determination area 70 and the second determination area 80 may be changed according to the dance of the character 32 before and after the reference time point. In this case, the game device 20 acquires information relating to a change direction of the body part of the character 32 within a period set based on the reference time point.

For example, the game device 20 acquires the information relating to the change direction of the determination subject body part (in other words, the change direction of the three-dimensional coordinates of the determination subject body part) of the character 32 within a period from a time point earlier than the reference time point by a predetermined time until a time point later than the reference time point by a predetermined time, based on the setting data and the motion data.

Then, the game device 20 changes the first determination area 70 and the second determination area 80 based on the acquired change direction. For example, the game device 20 changes the shapes of the first determination area 70 and the second determination area 80 so as to be widened toward a direction defined based on the change direction of the determination subject body part of the character 32. For example, in a case where the determination subject body part (for example, both hands) of the character 32 moves up and down significantly at the reference time point, the first determination area 70 and the second determination area 80 are changed to have the sizes widened upward and downward.

Note that the extent to which the first determination area 70 and the second determination area 80 have the sizes widened may be decided based on a change amount of the determination subject body part of the character 32. In this case, the game device 20 acquires information relating to the change amount of the determination subject body part of the character 32 based on the setting data and the motion data. The first determination area 70 and the second determination area 80 may be widened toward the change direction of the determination subject body part as the change amount of the determination subject body part becomes larger.

According to Modified Example (1), even in a situation in which such an action that the player infectiously moves their body too much in accordance with the dance of the character 32 is being performed, the shapes of the first determination area 70 and the second determination area 80 are changed according to the above-mentioned situation, and hence the action of the player can be evaluated.

(2) Further, in the embodiment, description is given of the example in which the motion data and the setting data are included as the reference data, but it suffices that the reference time point is associated with the reference position in the reference data. For example, the reference time point may be associated with information for identifying the first determination area 70 and the second determination area 80, or the reference time point may be associated with information indicating the position of the determination subject body part.

(3) Further, for example, the position data for determination may be stored for each of the characters 32 displayed on the game screen 30. In other words, the position data for determination to be used for the character 32 having a small body and the position data for determination to be used for the character 32 having a large body may be stored. By thus preparing the position data for determination, it is possible to display the mark 36 in a position that suits the size of the character 32.

Further, the player position information may be compared with the position data for determination after being corrected according to the size of the body of the player. In this case, the game device 20 includes means for acquiring information relating to the size of the body of the player based on the player position information, and the first determination unit 48 and the second determination unit 50 perform the evaluation of the action of the player by correcting the player position information so that the size of the body of the player matches the size of the body of the character 32.

For example, information relating to the size of the body of the player is acquired based on the distance between the head P1 included in the player position information and the median point between the left shin P10 and the right shin P11. In the same manner, the information relating to the size of the body of the character 32 is acquired based on the position data for determination. By correcting the player position information so that the size of the body of the player matches the character 32, it is possible to evaluate the action of the player with more accuracy.

(4) Further, in the embodiment, description is given of the example in which the position data for determination and the setting data are included as the reference data, but it suffices that the reference time point is associated with the reference position in the reference data. For example, the reference time point may be associated with the three-dimensional coordinates of the determination subject body part. Further, the position data for determination may be included in the motion data, and the motion data and the reference data may be integrally provided.

(5) Further, in this embodiment, description is given of the case where the game screen 30 is played based on the motion data, but a method of displaying the game screen 30 may be another method. For example, the game screen 30 may be displayed by preparing animation data.

(6) Further, for example, the above description is given by taking the example in which means for generating the player position information based on the photographed image and depth information (depth image) is included in the position detecting device 1, but the means for generating the player position information may be included in the game device 20. For example, the game device 20 may receive the photographed image and the depth image from the position detecting device 1 and generate the player position information based thereon.

(7) Further, in the above-mentioned embodiment and modified examples, description is given of the case where the game device 20 executes a dance game, but it, suffices that the game device 20 may execute a game configured so as to determine the position of the body part of the player at a given time point. The game executed by the game device 20 is not limited to the dance game, and in addition, a game configured such that, for example, the player exercises in time to the action of the character 32 without the output of the music track may be executed.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A game device, which executes a game configured such that a position of a body part of a player at a given time point is determined, comprising:
    player position information acquiring means for acquiring player position information relating to the position of the body part of the player;
    reference data acquiring means for acquiring reference data from means for storing the reference data, the reference data being obtained by associating information relating to a reference time point with information relating to a reference position in which the body part is to be placed at the reference time point;
    guide showing means for showing the player the reference time point and the reference position based on the reference data;
    first determination means for determining whether or not the reference position and the position of the body part of the player indicated by the player position information acquired at a first determination time point, which is a time point set based on the reference time point and which is earlier than the reference time point, satisfy a first criterion relating to a positional displacement between the position of the body part and the reference position;
    second determination means for determining whether or not the reference position and the position of the body part of the player indicated by the player position information acquired at a second determination time point, which is a time point set based on the reference time point and which is later than the first determination time point, satisfy a second criterion which is a criterion relating to the positional displacement between the position of the body part and the reference position and which indicates a smaller positional displacement than the positional displacement indicated by the first criterion;
    first processing execution means for performing processing relating to effects on the game based on a determination result from the first determination means; and
    second processing execution means for performing processing relating to evaluation of the player based on a determination result from the second determination means.

2. The game device according to claim 1, wherein:
    the first determination means determines whether or not the first criterion is satisfied by determining whether or not the position of the body part of the player indicated by the player position information acquired at the first determination time point is included in a first determination area set based on the reference position; and
    the second determination means determines whether or not the second criterion is satisfied by determining whether or not the position of the body part of the player indicated by the player position information acquired at the second determination time point is included in a second determination area which is an area set based on the reference position and which is covered by the first determination area.

3. The game device according to claim 2, wherein:
    the game comprises a game configured such that the player aims to perform the same action as a character displayed on display means; and
    the game device further comprises:
        means for acquiring information relating to a change direction of the body part of the character within a period set based on the reference time point; and
        means for changing the first determination area and the second determination area based on the acquired change direction.

4. The game device according to claim 1, wherein:
    the first determination means determines whether or not the first criterion is satisfied based on whether or not a number of body parts, whose positional displacement amount between the position of the body part of the player indicated by the player position information acquired at the first determination time point and the reference position is within a reference range, is within a first reference range; and
    the second determination means determines whether or not the second criterion is satisfied based on whether or not a number of body parts, whose positional displacement amount between the position of the body part of the player indicated by the player position information acquired at the second determination time point and the reference position is within the reference range, is within a second reference range whose lower limit value is larger than a lower limit value of the first reference range.

5. A control method for a game device which executes a game configured such that a position of a body part of a player at a given time point is determined, comprising:
    a player position information acquiring step of acquiring player position information relating to the position of the body part of the player;
    a reference data acquiring step of acquiring reference data from means for storing the reference data, the reference data being obtained by associating information relating to a reference time point with information relating to a reference position in which the body part is to be placed at the reference time point;
    a guide showing step of showing the player the reference time point and the reference position based on the reference data;
    a first determination step of determining whether or not the reference position and the position of the body part of the player indicated by the player position information acquired at a first determination time point, which is a time point set based on the reference time point and which is earlier than the reference time point, satisfy a first criterion relating to a positional displacement between the position of the body part and the reference position;

a second determination step of determining whether or not the reference position and the position of the body part of the player indicated by the player position information acquired at a second determination time point, which is a time point set based on the reference time point and which is later than the first determination time point, satisfy a second criterion which is a criterion relating to the positional displacement between the position of the body part and the reference position and which indicates a smaller positional displacement than the positional displacement indicated by the first criterion;

a first processing execution step of performing processing relating to effects on the game based on a determination result obtained in the first determination step; and a second processing execution step of performing processing relating to evaluation of the player based on a determination result obtained in the second determination step.

6. A non-transitory computer-readable information storage medium having recorded thereon a program for causing a computer to function as a game device which executes a game configured such that a position of a body part of a player at a given time point is determined, the game device comprising:

player position information acquiring means for acquiring player position information relating to the position of the body part of the player;

reference data acquiring means for acquiring reference data from means for storing the reference data, the reference data being obtained by associating information relating to a reference time point with information relating to a reference position in which the body part is to be placed at the reference time point;

guide showing means for showing the player the reference time point and the reference position based on the reference data;

first determination means for determining whether or not the reference position and the position of the body part of the player indicated by the player position information acquired at a first determination time point, which is a time point set based on the reference time point and which is earlier than the reference time point, satisfy a first criterion relating to a positional displacement between the position of the body part and the reference position;

second determination means for determining whether or not the reference position and the position of the body part of the player indicated by the player position information acquired at a second determination time point, which is a time point set based on the reference time point and which is later than the first determination time point, satisfy a second criterion which is a criterion relating to the positional displacement between the position of the body part and the reference position and which indicates a smaller positional displacement than the positional displacement indicated by the first criterion;

first processing execution means for performing processing relating to effects on the game based on a determination result from the first determination means; and second processing execution means for performing processing relating to evaluation of the player based on a determination result from the second determination means.

\* \* \* \* \*